United States Patent
Wolf et al.

(10) Patent No.: US 12,136,033 B2
(45) Date of Patent: Nov. 5, 2024

(54) METHOD AND SYSTEM FOR CHARACTERIZING A NANOSTRUCTURE BY MACHINE LEARNING

(71) Applicant: Ramot at Tel-Aviv University Ltd., Tel-Aviv (IL)

(72) Inventors: Lior Wolf, Herzlia (IL); Haim Suchowski, Kfar Mordechai (IL); Michael Mrejen, Tel Aviv (IL); Achiya Nagler, Tel Aviv (IL); Itzik Malkiel, Tel Aviv (IL); Uri Arieli, Tel Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 1386 days.

(21) Appl. No.: 16/484,490

(22) PCT Filed: Feb. 9, 2018

(86) PCT No.: PCT/IL2018/050149
§ 371 (c)(1),
(2) Date: Aug. 8, 2019

(87) PCT Pub. No.: WO2018/146683
PCT Pub. Date: Aug. 16, 2018

(65) Prior Publication Data
US 2020/0003678 A1 Jan. 2, 2020

Related U.S. Application Data

(60) Provisional application No. 62/456,781, filed on Feb. 9, 2017.

(51) Int. Cl.
*G01N 21/21* (2006.01)
*B82Y 40/00* (2011.01)
(Continued)

(52) U.S. Cl.
CPC ............... *G06N 3/08* (2013.01); *B82Y 40/00* (2013.01); *G01N 21/21* (2013.01); *G01N 21/31* (2013.01);
(Continued)

(58) Field of Classification Search
None
See application file for complete search history.

(56) References Cited

U.S. PATENT DOCUMENTS

| | | |
|---|---|---|
| 2008/0009081 A1 | 1/2008 | Madriaga et al. |
| 2012/0226644 A1 | 9/2012 | Jin et al. |

FOREIGN PATENT DOCUMENTS

| | | | |
|---|---|---|---|
| CN | 101393015 | 3/2009 | |
| WO | WO-2017012862 A1 * | 1/2017 | ........... B42D 25/305 |
| WO | WO 2018/146683 | 8/2018 | |

OTHER PUBLICATIONS

International Search Report and the Written Opinion Dated May 13, 2018 From the International Searching Authority Re. Application No. PCT/IL2018/050149. (13 Pages).

* cited by examiner

*Primary Examiner* — David R Vincent

(57) ABSTRACT

A method of designing a nanostructure, comprises: receiving a far field optical response and material properties; feeding the synthetic far field optical response and material properties to an artificial neural network having at least three hidden layers; and extracting from the artificial neural network a shape of a nanostructure corresponding to the far field optical response.

20 Claims, 23 Drawing Sheets

(51) Int. Cl.
  *G01N 21/31* (2006.01)
  *G06N 3/04* (2023.01)
  *G06N 3/048* (2023.01)
  *G06N 3/08* (2023.01)
  *G06N 3/086* (2023.01)
  *G06N 3/126* (2023.01)
(52) U.S. Cl.
  CPC ............... *G06N 3/04* (2013.01); *G06N 3/048* (2023.01); *G06N 3/086* (2013.01); *G06N 3/126* (2013.01)

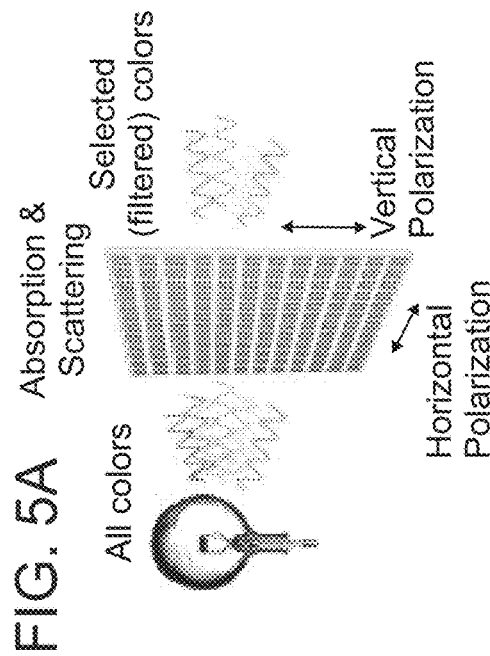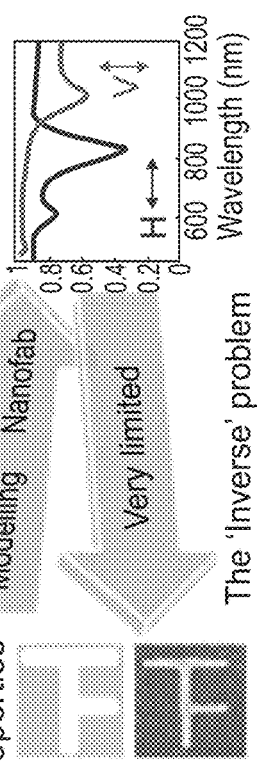
FIG. 5A
FIG. 5B
FIG. 5C

METHOD AND SYSTEM FOR CHARACTERIZING A NANOSTRUCTURE BY MACHINE LEARNING

RELATED APPLICATION

This application claims the benefit of priority of U.S. Provisional Patent Application No. 62/456,781 filed Feb. 9, 2017, the contents of which are incorporated herein by reference in their entirety.

FIELD AND BACKGROUND OF THE INVENTION

The present invention, in some embodiments thereof, relates to a combination of nanotechnology and machine learning and, more particularly, but not exclusively, to a method and system for characterizing a nanostructure by machine learning, for example, for the purpose of designing the nanostructure or retrieving a shape of an existing nanostructure.

Nanophotonics allows the manipulation of light-matter interaction with subwavelength structures, and has therefore revolutionized the field of optics. Nanophotonics is employed in many applications, including devices in which quantum wells are used to achieve manipulation of one laser beam by another, devices used to achieve great spatial resolution in optical object imaging, devices using arrays of subwavelength holes to achieve optical filtration or other related goals, electrooptical devices, and phonic convertors (e.g., amplitude to phase conversion logical devices).

Heretofore, designers of electronic devices and components frequently employ design tools to aid them. Computer-aided design makes use of automated rule checking and stock component types to allow a designer to rapidly create full circuit designs that conform to the requirements of the fabrication technology to be used. Unlike electronic devices, nanophotonic devices operate in the photonic domain, conventional computer-aided design techniques are not suitable for the design of such devices.

SUMMARY OF THE INVENTION

According to an aspect of some embodiments of the present invention there is provided a method of designing a nanostructure by receiving a synthetic far field optical response and material properties; by feeding the synthetic far field optical response and material properties to an artificial neural network having at least three hidden layers; and by extracting from the artificial neural network a shape of a nanostructure corresponding to the far field optical response.

According to an aspect of some embodiments of the present invention there is provided a system for designing a nanostructure. The system comprises a data processor configured to receive a far field optical response and material properties, and to execute the method as delineated above and optionally and preferably as detailed below.

According to an aspect of some embodiments of the present invention there is provided a method of manufacturing a nanostructure, by executing the method as delineated above and optionally and preferably as detailed below, and fabricating a nanostructure having the shape from a material having the and material properties.

According to an aspect of some embodiments of the present invention there is provided a method of determining a shape of a nanostructure. The method comprises: illuminating the nanostructure by light having a wavelength longer than a longest dimension of the nanostructure; receiving a far field optical response of the nanostructure to the wavelength in response to the light; feeding the far field optical response and material properties of the nanostructure to an artificial neural network having at least three hidden layers; and characterizing at least one state or physical property of the nanostructure base on output of the artificial neural network.

According to some embodiments of the present invention the physical property is a shape of the nanostructure.

According to some embodiments of the present invention the physical property is a composition of materials from which the nanostructure is made.

According to some embodiments of the present invention the state is a temperature of the nanostructure.

According to an aspect of some embodiments of the present invention there is provided a computer software product. The computer software product comprises a non-transitory computer-readable medium in which program instructions are stored, which instructions, when read by a data processor, cause the data processor to receive a receive a synthetic far field optical response and material properties, and to execute the method as delineated above and optionally and preferably as detailed below.

According to some embodiments of the invention the artificial neural network comprises at least two parallel sets of layers, wherein the far field optical response and material properties are fed to different sets of layers of the artificial neural network According to some embodiments of the invention the far field optical response comprises a spectrum describing a response to a linearly polarized light.

According to some embodiments of the invention all parallel sets of layers have the same number of layers.

According to some embodiments of the invention each set of the parallel sets of layers comprises at most five layers.

According to some embodiments of the invention each set of the parallel sets of layers comprises three layers.

According to some embodiments of the invention the artificial neural network comprises a set of fully connected layers.

According to some embodiments of the invention the set of fully connected layers has at least five but no more than eight layers.

According to some embodiments of the invention the set of fully connected layers has six layers.

According to some embodiments of the invention the artificial neural network comprises a bi-directional network having a geometry predicting subnetwork designed to predict a geometry based on spectra and a spectrum predicting subnetwork designed to predict spectra based on geometry.

According to some embodiments of the invention each subnetwork comprises the same number of fully connected layers.

According to some embodiments of the invention the geometry predicting subnetwork comprises three parallel sets of layers, and six fully connected layers, wherein each set of the parallel sets of layers comprises three layers.

According to some embodiments of the invention the spectrum predicting subnetwork comprises a set of fully connected layers. According to some embodiments of the invention the spectrum predicting subnetwork comprises six fully connected layers.

According to some embodiments of the invention the far field optical response comprises a first spectrum describing a response to a horizontally polarized light, and a second spectrum describing a response to a vertically polarized light.

According to some embodiments of the invention the artificial neural network comprises three parallel sets of layers, wherein the first spectrum is fed to a first set of layers, the second spectrum is fed to a second set of layers, and the material properties are fed to third set of layers.

According to some embodiments of the invention the nanostructure serves as a component in a system selected from the group consisting of a sensor, an imager, a medical system injectable into the body of a mammal, a memory medium, a solar cell, a beam shaping system, and an antenna.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-C are schematic illustrations explaining a concept of deep learning nanophotonics and an inverse problem that is solved according to some embodiments of the present invention;

DESCRIPTION OF SPECIFIC EMBODIMENTS OF THE INVENTION

Figure 1:
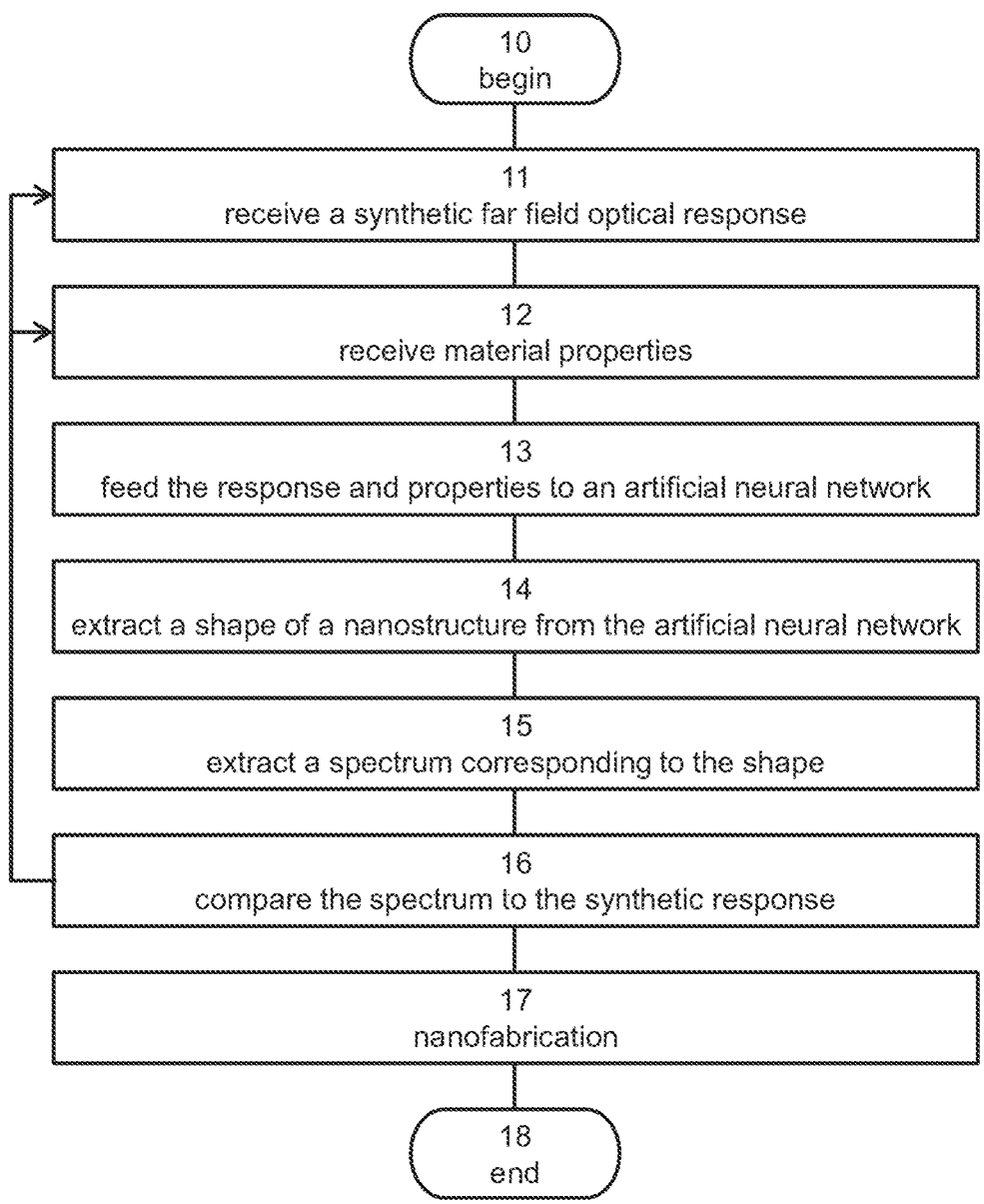
FIG. 1 is a flowchart diagram of a method suitable for designing and optionally and preferably fabricating a nanostructure, according to various exemplary embodiments of the present invention.

The present invention, in some embodiments thereof, relates to a combination of nanotechnology and machine learning and, more particularly, but not exclusively, to a method and system for characterizing a nanostructure by machine learning, for example, for the purpose of designing the nanostructure or retrieving one or parameters describing the nanostructure (e.g., shape, temperature, composition of materials, etc.).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flowchart diagram of a method suitable for designing and optionally and preferably fabricating a nanostructure, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

At least part of the operations described herein can be can be implemented by a data processing system, e.g., a dedicated circuitry or a general purpose computer, configured for receiving data and executing the operations described below. At least part of the operations can be implemented by a cloud-computing facility at a remote location.

Computer programs implementing the method of the present embodiments can commonly be distributed to users by a communication network or on a distribution medium such as, but not limited to, a floppy disk, a CD-ROM, a flash memory device and a portable hard drive. From the communication network or distribution medium, the computer programs can be copied to a hard disk or a similar intermediate storage medium. The computer programs can be run by loading the code instructions either from their distribution medium or their intermediate storage medium into the execution memory of the computer, configuring the computer to act in accordance with the method of this invention. During operation, the computer can store in a memory data structures or values obtained by intermediate calculations and pulls these data structures or values for use in subsequent operation. All these operations are well-known to those skilled in the art of computer systems.

Processing operations described herein may be performed by means of processer circuit, such as a DSP, microcontroller, FPGA, ASIC, etc., or any other conventional and/or dedicated computing system.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

The term "nanostructure" generally refers to a three-dimensional body made of a solid substance, in which its largest dimension is at less than 1 μm and more than 1 nm. In some exemplary embodiments of the invention the largest dimension of the nanostructure (e.g., the diameter or major axis) is from about 30 nm to about 800 nm.

Representative examples of materials suitable for use as the nanostructures of the present embodiments include, without limitation, metal, e.g., gold, silver, aluminum, chromium and platinum.

The term "elongated" when referred to a nanostructure or a part thereof means a three-dimensional body made of a solid substance, in which one of its dimensions is at least 2 times, or at least 10 times, or at least 50 times e.g., at least 100 times larger than any of the other two dimensions. The largest dimension of the elongated solid structure is referred to herein as the longitudinal dimension or the length of the nanostructure, and the other two dimensions are referred to herein as the transverse dimensions. The largest of the transverse dimensions is referred to herein as the diameter or width of the elongated nanostructure. The ratio between the length and the width of the nanostructure is known as the aspect ratio of the nanostructure.

In various exemplary embodiments of the invention the length of the elongated nanostructure is at least 50 nm, or at least 100 nm, or at least 500 nm, or at least 1 μm, or at least 2 μm, or at least 3 μm, e.g., about 4 μm, or more. The width of the elongated nanostructure is preferably less than 1 μm. In various exemplary embodiments of the invention the width of the nanostructure is from about 30 nm to about 200 nm.

Referring now to FIG. 1, the method begins at 10 and optionally and preferably continues to 11 at which a far field optical response is received, and to 12 at which one or more material properties are received. The far field optical response is preferably synthetic, but receiving a measured far field optical response is also contemplated in some embodiments of the present invention.

The term "far field optical response" refers to the reflection or transmission of an optical field at one or more wavelengths of interest as measured at distances far greater (e.g., at least two, or at least four, or at least eight, or at least ten times greater) than these wavelengths, and optimally also far greater than the size of the nanostructure to be designed.

In various exemplary embodiments of the invention, the far field optical response describes the response of the optical field to an interaction with the nanostructure to be designed, and the material properties describe the response of the material from which the nanostructure to be designed is to be fabricated to an interaction with the optical field.

The far field optical response is optionally and preferably in the form of a discrete spectrum. The discrete spectrum can comprise a set of one or more, optionally and preferably two or more, optical transmission or optical reflection coefficient dips corresponding to wavelengths or frequencies at which an interaction of an object with an electromagnetic field exhibits a resonance. The optical response can optionally and preferably includes a width and depth of each of these dips. In some embodiments of the present invention the spectrum received at 11 describes a response to a linearly polarized light. The inventors of the present invention found that it is advantageous to receive at 11 two spectra: a first spectrum describing a response to a horizontally polarized light, and a second spectrum describing a response to a vertically polarized light. As demonstrated in the Examples, section that follows, the input of two separate spectra improves the accuracy of the design.

The material properties can include a plurality of parameters that characterize the bulk material from which the nanostructure to be designed is to be fabricated. These parameters can include, for example, a set of parameters that define a characteristic function describing the bulk material, particularly, but not necessarily, a characteristic function that describes variations in the bulk material due to its interaction with an electromagnetic field. Representative examples of characteristic functions suitable for the present embodiments include, without limitation, a characteristic dielectric function, a characteristic conductivity function, a characteristic permeability function, and the like.

In some preferred embodiments of the invention the characteristic function is a dielectric function. In these embodiments, the set of parameters that define the dielectric function can optionally and preferably include parameters of the Brendel and Bormann (BB) model, as described in Brendel et al., "An infrared dielectric function model for amorphous solids," Journal of Applied Physics. 1992; 71(1):1-6. Other models, such as, but not limited to, the Drude model or the Lorentz-Drude model described in Rakic et al., "Optical properties of metallic films for vertical-cavity optoelectronic devices", Applied Optics 37, 5271-5283 (1998), are also contemplated in some embodiments of the present invention.

As a representative and non-limiting example, the BB model uses a superposition of oscillators (termed BB oscillators) to represent the dielectric function. The BB dielectric function is defined as:

$$\varepsilon_{BB}(\omega) = 1 - \frac{\omega_p^2}{\omega(\omega - i\Gamma_0)} + \sum_{j=1}^{k} \chi_j(\omega)$$

$$\omega_p = \left(\frac{n_0 \times e^2}{\varepsilon_0 \times m_e}\right)^{1/2}$$

where $\Gamma_0$ is the damping constant of the bulk material, $\chi_j(\omega)$ is a BB oscillator, $\omega_p$ is a plasma frequency in the Drude model, no is the electron density of bulk material, e is the elementary charge, and $m_e$ is the effective electron mass.

The method continues to 13 at which the far field optical response and the material properties are fed to an artificial neural network. When the optical response includes more than one spectrum, two or more of the spectra are optionally and preferably fed together into the artificial neural network, in which case the artificial neural network operates on two or more spectra simultaneously. Alternatively, each of the spectra can optionally be fed separately, and the artificial neural network can run in sequential manner, wherein the next spectrum is fed only after the artificial neural network completes its operation using the previous spectrum.

At 14 one or more parameters that describe the nanostructure and that correspond to the far field optical response is extracted from the artificial neural network. The type of parameter that is extracted depends on the type of dataset that was used to train the artificial neural network. Typically, the artificial neural network is trained based on training shape dataset, and so the extracted parameter includes the shape that corresponds to the to the far field optical response. Yet, other types of datasets can be used for training (e.g., a training temperature dataset, or a training dataset containing composition of materials, or the like). Thus, while the embodiments below are described with a particular emphasis to shape extraction, it is to be understood that extraction of other parameters that describe the nanostructure (e.g., temperature, composition of materials, etc.) is also contemplated in some embodiments of the present invention.

Artificial neural networks are a class of computer implemented techniques that are based on a concept of interconnected "artificial neurons," also abbreviated "neurons."

In a typical artificial neural network, the artificial neurons contain data values, each of which affects the value of a connected artificial neuron according to connections with pre-defined strengths, and whether the sum of connections to each particular artificial neuron meets a pre-defined threshold. By determining proper connection strengths and threshold values (a process referred to as training), an artificial neural network can achieve efficient recognition of rules in the data. The artificial neurons are oftentimes grouped into interconnected layers, the number of which is referred to as the depth of the artificial neural network. Each layer of the network may have differing numbers of artificial neurons, and these may or may not be related to particular qualities of the input data. Some layers or sets of interconnected layers of an artificial neural network may operate independently from each other. Such layers or sets of interconnected layers are referred to as parallel layers or parallel sets of interconnected layers.

The basic unit of an artificial neural network is therefore the artificial neuron. It typically performs a scalar product of its input (a vector x) and a weight vector w. The input is given, while the weights are learned during the training phase and are held fixed during the validation or the testing phase. Bias may be introduced to the computation by concatenating a fixed value of 1 to the input vector creating a slightly longer input vector x, and increasing the dimensionality of w by one. The scalar product is typically followed by a non-linear activation function $\sigma:R \to R$, and the neuron thus computes the value $\sigma(w^T x)$. Many types of activation functions that are known in the art, can be used in the artificial neural network of the present embodiments, including, without limitation, Binary step, Soft step, TanH, ArcTan, Softsign, Inverse square root unit (ISRU), Rectified linear unit (ReLU), Leaky rectified linear unit, Parametric rectified linear unit (PReLU), Randomized leaky rectified linear unit (RReLU), Exponential linear unit (ELU), Scaled exponential linear unit (SELU), S-shaped rectified linear activation unit (SReLU), Inverse square root linear unit (ISRLU), Adaptive piecewise linear (APL), SoftPlus, Bent identity, SoftExponential, Sinusoid, Sinc, Gaussian, Softmax and Maxout. In some embodiments of the present invention ReLU or a variant thereof (e.g., PReLU, RReLU, SReLU) is used.

A layered neural network architecture $(V,E,\sigma)$ is typically defined by a set V of layers, a set E of directed edges and the activation function $\sigma$. In addition, a neural network of a certain architecture is defined by a weight function $w:E \to R$.

In one implementation, called a fully-connected artificial neural network, every neuron of layer $V_i$ is connected to every neuron of layer $V_{i+1}$. In other words, the input of every neuron in layer $V_{i+1}$ consists of a combination (e.g., a sum) of the activation values (the values after the activation function) of all the neurons in the previous layer $V_i$. This combination can be compared to a bias, or threshold. If the value exceeds the threshold for a particular neuron, that neuron can hold a positive value which can be used as input to neurons in the next layer of neurons.

The computation of activation values continues through the various layers of the neural network, until it reaches a final layer, which is oftentimes called the output layer. Typically some concatenation of neuron values is executed before the output layer. At this point, the output of the neural network routine can be extracted from the values in the output layer. In the present embodiments, the output of the neural network describes the shape of the nanostructure. Typically the output can be a vector of numbers characterizing lengths, directions and/or angles describing various two- or three-dimensional geometrical features that collectively form the shape of the nanostructure.

For example, the nanostructure can a priori be described as a graph with vertices and edges, wherein the edges describe elongated geometrical nanometric features the are part of the nanostructure and that collectively form the nanostructure, and the vertices describes points of connection between elongated geometrical features. In these embodiments, the output can include a set of binary numbers describing which of the edges of the graph exists (e.g., "1" for an existing edge and "0" for a non-existing edge), thereby describing the nanostructure. Also contemplated are embodiments in which one or more of the edges is also associated with a length and/or an orientation, in which case the output optionally and preferably also includes non-binary numbers corresponding to the length and/or an orientation of the respective edge.

The nanostructure can alternatively or additionally be a priori described according to a multi-segment template with a plurality of elongated nanometric segments (e.g., linear nanometric segments) wherein at least two or at least three of the segments are not co-linear with at least one other segment. In these embodiments, the output can include a set of binary numbers describing which of the segments of the template exists in the designed nanostructure (e.g., "1" for an existing segment and "0" for a non-existing segment), thereby describing the nanostructure. Also contemplated are embodiments in which one or more of the segments is also associated with a length and/or an orientation, in which case the output optionally and preferably also includes non-binary numbers corresponding to the length and/or an orientation of the respective segment.

As a simplified example, suppose that the nanostructure is a priori described according to a 7-segment template, such as those well-known templates that are used in 7-segment displays. In this case, the output can be a 7-component vector whose components respectively correspond to the segments a, b, c, d, e, f and g of the template, where a, g and d are, respectively, the upper, middle and lower horizontal segments of the 7-segment template, and f, b, e and c are, respectively, the upper-left, upper-right, lower-left, and lower-right vertical segments of the 7-segment template. Thus, for example, an output vector (1,1,1,1,1,1,1) can represent a 7-segment nanostructure whose shape is a figure of 8, an output vector (0,0,0,0,1,1,0) can represent a 7-segment nanostructure whose shape is a figure of 1, an output vector (1,1,1,1,1,1,0) can represent a 7-segment nanostructure whose shape is a figure of 0, etc. Some examples of such descriptions of shapes of nanostructures, for the case of a 5-segment template, are provided in the Examples section that follows (see, e.g., FIGS. 8C and 8F, and Tables 1, 2, 5 and 6).

In some embodiments of the present invention the nanostructure is also described a priori using a spatial periodicity parameter and the network is trained using a training dataset that also includes this parameter. These embodiments are useful when it is desired to construct a network that is capable of determining shapes of nanostructures that have one or more features that repeat themselves one or more times over some length. For example, a nanostructure having two or more linear segments having about the same length, about the same width and about the same orientation, can be defined as a nano structure that is periodic with respect to these specific length, width and orientation. During the learning phase, the network can be fed also with information regarding nanostructures with periodicity, so that at the periodicity can be learned by the network. When the network is used for characterizing an unknown nanostructure (also referred to as "the query phase" of the execution), the output of the neural network can include a vector of numbers characterizing the periodicity of the nanostructure, aside for the other spatial parameters (lengths, directions and/or angles), so that the periodicity is included as one of the parameters that describe the two- or three-dimensional geometrical features that collectively form the shape of the nanostructure.

Figure 2:
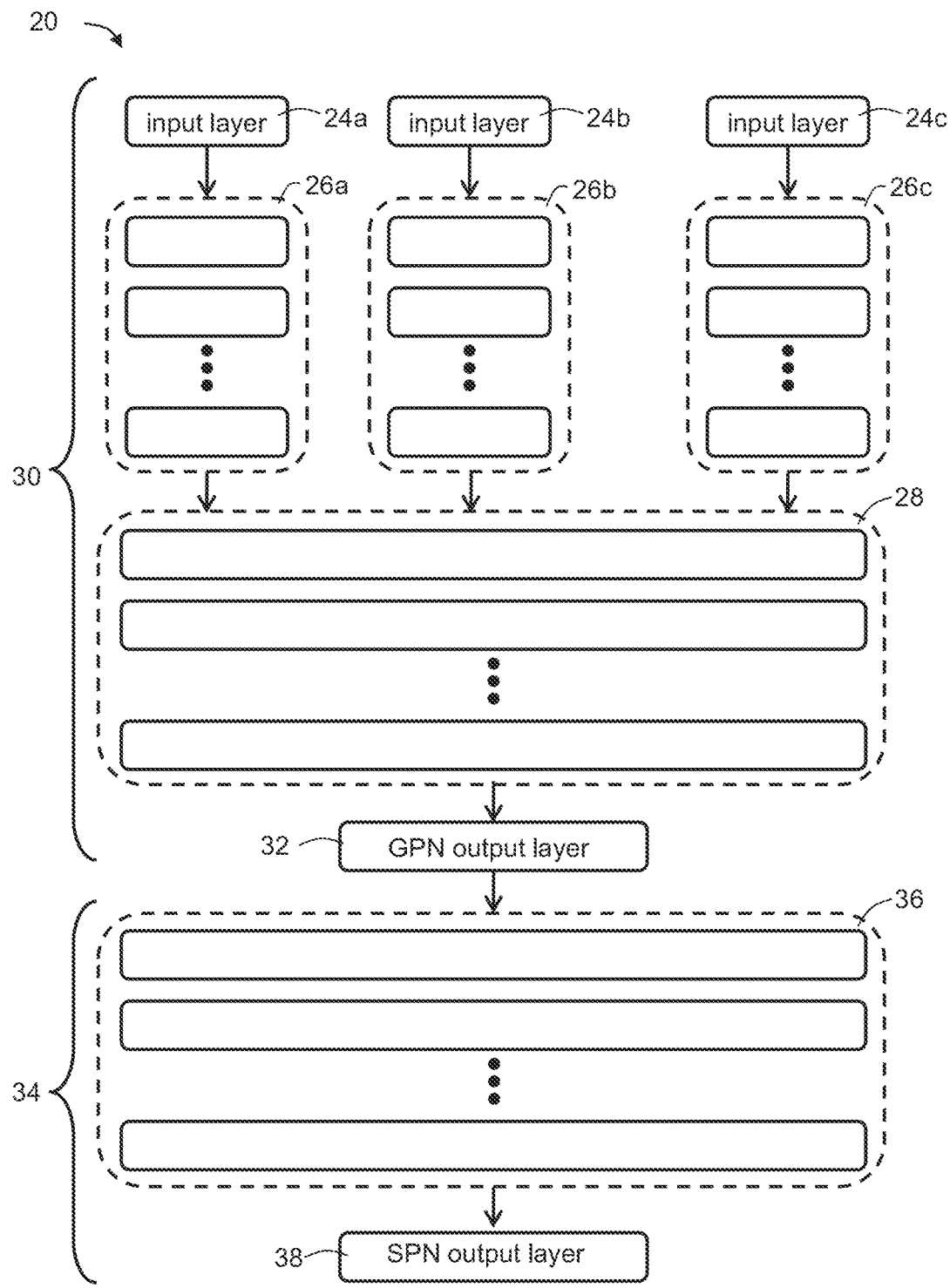
FIG. 2 is a schematic illustration showing a representative example of an artificial neural network according to some embodiments of the present invention.

A representative example of an artificial neural network 20 suitable for the present embodiments is illustrated in FIG. 2.

Network 20 preferably has at least three or at least three or at least four or at least five or at least six or at least seven or at least eight or at least nine or more hidden layers. Network 20 optionally and preferably comprises several input layers 24*a*, 24*b* 24*c* that are fed by the optical response and the material properties. Shown in FIG. 2 are three input layers but network 20 can include any number of input layers, optionally and preferably at least two input layers. For example, one of the input layers can be fed with the material properties, and one of the input layers can be fed by a spectrum. When two or more spectra are fed together, each spectrum is optionally and preferably fed to a separate input layer. Thus, for example, In some embodiments of the present invention layer 24*a* is fed by the material properties, layer 24*b* is fed by a spectrum describing a response to a linearly and horizontally polarized electromagnetic radiation, and layer 24*c* is fed by a spectrum describing a response to a linearly and vertically polarized electromagnetic radiation.

Network 20 can also comprise several parallel sets 26*a*, 26*b*, 26*c* of layers that are respectively fed by the output of the input layers 24*a-c*. Shown in FIG. 2 are three parallel sets of layers but network 20 can include any number of parallel sets of layers, optionally and preferably at least two parallel sets. The number of parallel sets s typically the same as the number of input layers.

Preferably, there are no interconnections among the parallel sets 26*a*, 26*b*, 26*c*, so that each of the parallel sets processes the output of the respective input layer separately. For example, set 26*a* can process the material properties, set 26*b* can process the spectrum describing the response to horizontal polarization, and layer 26*c* can process the spectrum describing the response vertical polarization. Yet, the layers in each of sets 26*a*, 26*b*, 26*c* are preferably fully connected layers within the respective set, wherein each layer within a set receives a combination of the outputs provided by a layer preceding the respective fully connected layer of the same set. Thus, each of sets 26*a*, 26*b*, 26*c* forms a fully connected subnetwork. In some embodiments of the present invention, sets 26*a*, 26*b*, 26*c* have the same number of layers. Typically, but not necessarily, each of sets 26*a*, 26*b*, 26*c* comprises at most five layers or at most four layers. In experiments performed by the present inventors it was found that accurate and fast results can be obtained when each of sets 26*a*, 26*b*, 26*c* comprises three layers.

The number of neurons in each of the layers of sets 26*a*, 26*b*, 26*c* is preferably at least 10 or at least 20 or at least 30 or at least 40. In these sets the number of neurons is optionally and preferably increased as one move deeper into the set. Thus, for example, when the number of neurons in the first layer is about 40, the number of neurons in the last layer is about 100.

In various exemplary embodiments of the invention network 20 comprises an additional set 28 of fully connected layers, that receives and process the outputs of each of the parallel sets 26a, 26b, 26c. Preferably, each neuron of the first layer of set 28 is fully connected to the outputs of the last layers of sets 26a, 26b, 26c, so that each of these neurons receives a non-linear combination of the activation values of all the neurons in each of the last layers in parallel sets 26a, 26b, 26c. Set 28 optionally and preferably has at least five or at least six or at least seven layers. Preferably, set 28 comprises no more than eight layers. In experiments performed by the present inventors it was found that accurate and fast results can be obtained when set 28 comprises six layers.

The number of neurons in each of the layers of set 28 is preferably at least 100 or at least 200 or at least 300. In set 28 the number of neurons is optionally and preferably increased as one move deeper into the set. Thus, for example, when the number of neurons in the first layer is about 300, the number of neurons in the last layer (prior to concatenation, e.g., for output purpose) is about 750.

The input layers 24, the parallel sets 26 and the additional set 28 form together a subnetwork 30. Subnetwork 30 optionally and preferably comprise an output layer 32 from which the shape of the nanostructure corresponding to the far field optical response can be extracted, as further detailed hereinabove. Subnetwork 30 is referred to herein as a geometry predicting subnetwork (GPN), since it predicts the geometry of the nanostructure from its far field optical response.

In some embodiments of the present invention, network 20 comprises an additional subnetwork 34 that receives its input from subnetwork 30 (for example, from its output layer 32 or directly from the last layer of set 28) and predicts a spectrum. Subnetwork 34 is referred to as a spectrum predicting subnetwork (SPN), because the activation values in output layer 32 and the last layer of set 28 (which are the input to subnetwork 34) include information describing the shape of the nanostructure, so that it predicts the spectrum from the geometry of the nanostructure.

Subnetwork 34 optionally and preferably comprise an output layer 38 from which the spectrum of the nanostructure corresponding to shape of the nanostructure can be extracted. The extracted spectrum can be a discrete spectrum that comprises a set of one or more, optionally and preferably two or more, numbers describing optical transmission or optical reflection coefficient dips corresponding to wavelengths or frequencies at which an interaction of the nanostructure with an electromagnetic field exhibits a resonance. The extracted spectrum can optionally and preferably includes a width and depth of each of these dips. In some embodiments of the present invention the extracted spectrum describes a response to a linearly polarized light. In some embodiments of the present invention the extracted spectrum describes a response to a horizontally polarized light, and in some embodiments of the present invention the extracted spectrum describes a response to a vertically polarized light. When the artificial neural network 20 operates on two or more spectra simultaneously, output layer 38 provides more than one spectrum (e.g., a spectrum that describes a response to a horizontally polarized light, and a spectrum that describes a response to a vertically polarized light).

In various exemplary embodiments of the invention subnetwork 34 comprises a set 36 of fully connected layers. Set 36 optionally and preferably has at least five or at least six or at least seven layers. Preferably, set 36 comprises no more than eight layers. In some embodiments of the present invention each of sets 28 and 36 includes the same number of layers. In experiments performed by the present inventors it was found that accurate and fast results can be obtained when set 36 comprises six layers.

The number of neurons in each of the layers of set 36 is preferably at least 10 or at least 20 or at least 30. In set 36 the number of neurons is optionally and preferably increased as one move deeper into the set. Thus, for example, when the number of neurons in the first layer is about 30, the number of neurons in the last layer (prior to concatenation, e.g., for output purpose) is about 1000.

Thus, in embodiments in which network 20 includes both geometry predicting subnetwork 30 and spectrum predicting subnetwork 34, the network 20 can be viewed as a bi-directional network since it first receives a spectrum, then processes the spectrum to determine the geometry of the nanostructure, and processes back the geometry of the nanostructure to determine its spectrum. Such a bi-directional processing allows analyzing the accuracy of the extracted shape of the nanostructure, wherein the level of matching (e.g., the mean squared error) between the spectrum output of the spectrum predicting subnetwork 34, and the spectrum input of the geometry predicting subnetwork 30, can be used as an accuracy parameter. The accuracy parameter can be compared 16 to a threshold, and the method can determine, based on this comparison, whether or not the prediction is sufficiently accurate. When the prediction is sufficiently accurate, the method optionally and preferably proceeds to 17 at which a nanostructure is fabricated based on the shape extracted at 14 from the material whose properties were received at 12. When the comparison 16 reveals that the prediction accuracy is insufficient, the method can optionally and preferably loop back to 11 or 12 and re-execute 13 and 14 and optionally also 15 and 16 for a modified input (e.g., a different material or one or more modified spectra for the optical response).

The fabrication 17 can include any nanofabrication process known in the art, including, without limitation, nanolithography, nanoimprinting, embossing molding e-beam lithography, Focused Ion beam (FIB) lithography, self-assembly techniques, and the like.

The fabricated nanostructure can serve as a component in a system such as, but not limited to, a sensor, an imager, a medical system injectable into the body of a mammal, a memory medium, a solar cell, a beam shaping system, an antenna and the like.

In some embodiments of the present invention, operations 15 and 16 are skipped and the method continues to 17 directly from 14. In some embodiments of the present invention, operation 17 is skipped and the method stores the extracted shape and optionally also the extracted spectrum in a non-transitory computer-readable storage medium. During training, both subnetworks 30 and 34 are preferably used but the fabrication step 17 is preferably skipped. The training of network 20 is optionally and preferably a dedicated and non-conventional learning procedure since the input to the SPN 34 is a predicted geometry rather than an actual geometry. The inventors found a significant gain from training the network on all the training sets rather than the alternative of training multiple separate subnetworks. In some embodiments of the present invention the training includes two phases, where in a first phase, the subnetwork 30 is trained to predict the geometry based on the spectrum, and in a second phase subnetwork 34 is trained after subnetwork 30.

The method ends at 18.

Figure 3:
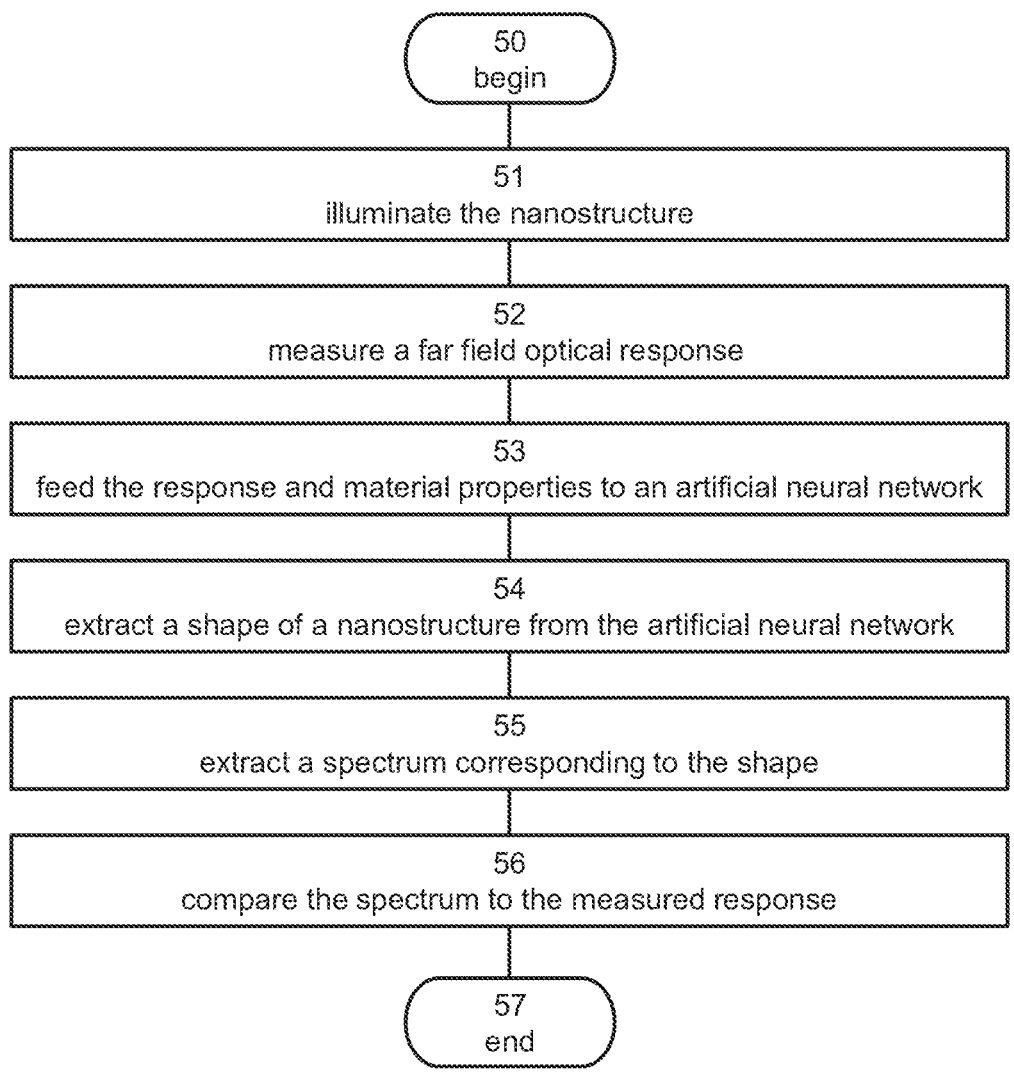
FIG. 3 is a flowchart diagram of a method suitable for determining one or parameters describing a nanostructure or a state of a nanostructure, according to various exemplary embodiments of the present invention.

FIG. 3 is a flowchart diagram of a method suitable for determining one or parameters describing a nanostructure or a state of a nanostructure (e.g., shape, temperature, composition of materials, etc.), according to various exemplary embodiments of the present invention. The method can be used for determining any descriptive parameter, such as, but not limited to, shape temperature, composition of materials, and the like, and is particularly, but not exclusively, useful for being executed after the nanostructure is incorporated into a fabricated nanophotonic device. This is advantageous over conventional techniques since once a nanostructure is incorporated into a nanophotonic device its characterization requires expensive and iterative methods.

The method begins at 50 and continues to 51 at which the nanostructure is illuminated by light having a wavelength longer than a longest dimension of the nanostructure. Typically, but not necessarily, the nanostructure is illuminated in situ, after it has been incorporated in a nanophotonic device, such as, but not limited to, a sensor, an imager, a medical system injectable into the body of a mammal, a memory medium, a solar cell, a beam shaping system, an antenna and the like.

The method continues to 52 at which a far field optical response of the nanostructure to the wavelength in response to the light is measured. For example, the light passing through, or reflected off, the nanostructure can be analyzed by a spectrometer to determine a spectrum having a set of one or more, optionally and preferably two or more, optical transmission coefficient dips.

The method continues to 53 at which the measured far field optical response and material properties of the nanostructure are fed to an artificial neural network, such as, but not limited to, network 20. The method can then continue to 54 at which the shape of a nanostructure corresponding to the far field optical response is extracting from the artificial neural network as further detailed hereinabove. Optionally, the bi-directional property of network 20 is also exploited and the method proceeds to 55 at which the spectrum that corresponds to the extracted shape is extracted, and to 56 at which the extracted spectrum is compared to the measured spectrum, for example, to determine the accuracy of the geometry prediction as further detailed hereinabove. The method ends at 57.

Figure 4:
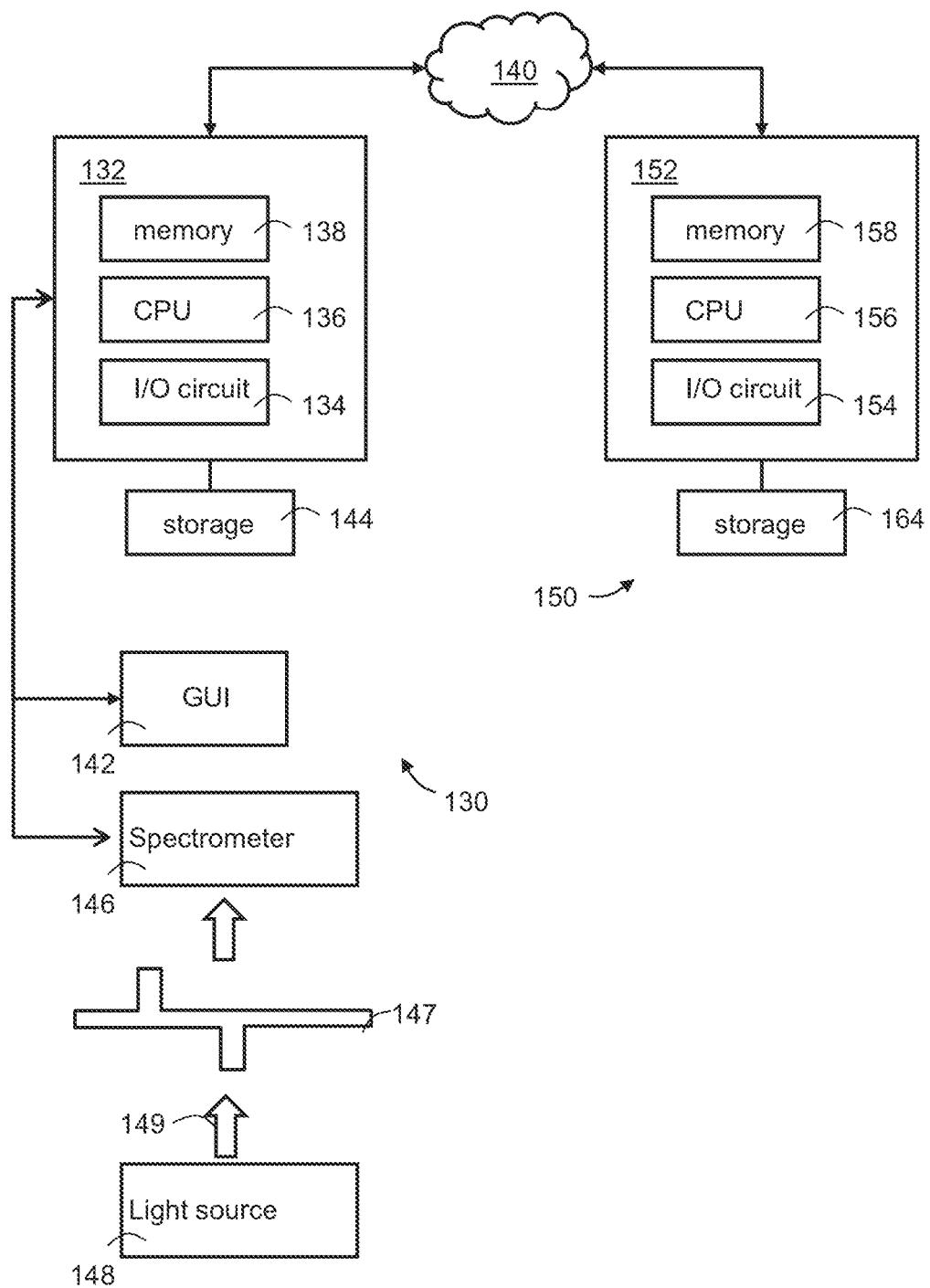
FIG. 4 is a schematic illustration of a computer system configured according to some embodiments of the present invention for executing at least some of the operations of the method described herein.

FIG. 4 is a schematic illustration of a client computer 130 having a hardware processor 132, which typically comprises an input/output (I/O) circuit 134, a hardware central processing unit (CPU) 136 (e.g., a hardware microprocessor), and a hardware memory 138 which typically includes both volatile memory and non-volatile memory. CPU 136 is in communication with I/O circuit 134 and memory 138. Client computer 130 preferably comprises a graphical user interface (GUI) 142 in communication with processor 132. I/O circuit 134 preferably communicates information in appropriately structured form to and from GUI 142. Also shown is a server computer 150 which can similarly include a hardware processor 152, an I/O circuit 154, a hardware CPU 156, a hardware memory 158. I/O circuits 134 and 154 of client 130 and server 150 computers can operate as transceivers that communicate information with each other via a wired or wireless communication. For example, client 130 and server 150 computers can communicate via a network 140, such as a local area network (LAN), a wide area network (WAN) or the Internet. Server computer 150 can be in some embodiments be a part of a cloud computing resource of a cloud computing facility in communication with client computer 130 over the network 140. Further shown, is an imaging device 146 such as a camera or a scanner that is associated with client computer 130.

GUI 142 and processor 132 can be integrated together within the same housing or they can be separate units communicating with each other. Similarly, imaging device 146 and processor 132 can be integrated together within the same housing or they can be separate units communicating with each other.

GUI 142 can optionally and preferably be part of a system including a dedicated CPU and I/O circuits (not shown) to allow GUI 142 to communicate with processor 132. Processor 132 issues to GUI 142 graphical and textual output generated by CPU 136. Processor 132 also receives from GUI 142 signals pertaining to control commands generated by GUI 142 in response to user input. GUI 142 can be of any type known in the art, such as, but not limited to, a keyboard and a display, a touch screen, and the like. In preferred embodiments, GUI 142 is a GUI of a mobile device such as a smartphone, a tablet, a smartwatch and the like. When GUI 142 is a GUI of a mobile device, processor 132, the CPU circuit of the mobile device can serve as processor 132 and can execute the code instructions described herein.

Client 130 and server 150 computers can further comprise one or more computer-readable storage media 144, 164, respectively. Media 144 and 164 are preferably non-transitory storage media storing computer code instructions as further detailed herein, and processors 132 and 152 execute these code instructions. The code instructions can be run by loading the respective code instructions into the respective execution memories 138 and 158 of the respective processors 132 and 152.

Each of storage media 144 and 164 can store program instructions which, when read by the respective processor, cause the processor to execute at least some operations of method 10 or method 50 as described herein.

In some embodiments of the present invention, a light source 148 illuminates the nanostructure 147 by light 149 having a wavelength longer than a longest dimension of nanostructure 147. A spectrometer 146 receives a far field optical response of the nanostructure to the wavelength in response to light 147. A spectrum is generated by spectrometer 130 and is transmitted to processor 132 by means of I/O circuit 134. Processor 132 predicts the shape of the nanostructures as further detailed hereinabove and display the shape, for example, on GUI 142. Alternatively, processor 132 can transmit the spectrum over network 140 to server computer 150. Computer 150 receives the spectrum, predicts the shape of the nanostructure as further detailed hereinabove and transmits the shape back to computer 130 over network 140. Computer 130 receives the shape and displays it on GUI 142.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

When reference is made to particular sequence listings, such reference is to be understood to also encompass sequences that substantially correspond to its complementary sequence as including minor sequence variations, resulting from, e.g., sequencing errors, cloning errors, or other alterations resulting in base substitution, base deletion or base addition, provided that the frequency of such variations is less than 1 in 50 nucleotides, alternatively, less than 1 in 100 nucleotides, alternatively, less than 1 in 200 nucleotides, alternatively, less than 1 in 500 nucleotides, alternatively, less than 1 in 1000 nucleotides, alternatively, less than 1 in 5,000 nucleotides, alternatively, less than 1 in 10,000 nucleotides.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Computer science has been harnessed to address the diffraction limit in imaging and characterization on one hand (super-resolution techniques such as PALM and STORM techniques and more (9-12)) and to assist with the design process on the other hand (13-15).

The visual perception of our surroundings is ultimately limited by the diffraction-limit, which stipulates that optical information smaller than roughly half the illumination wavelength is not retrievable. Over the past decades, many breakthroughs have led to unprecedented imaging capabilities beyond the diffraction-limit, with applications in biology and nanotechnology. In this context, nanophotonics has revolutionized the field of optics in recent years by enabling the manipulation of light-matter interaction with subwavelength structures (1-3).

Big Data and modern machine learning have revolutionized computer science in the past few years. Among the most promising and successful machine learning techniques, Deep Learning (DL) has emerged as a very powerful method that has achieved state-of-the-art results in various tasks, including computer vision (16), speech recognition (17), natural language processing (18), face recognition and others (19). Inspired by the layered and hierarchical human brain's deep architecture, DL uses multiple layers of non-linear transformation to model high-level abstraction in data. DL has also been successfully employed in research areas beyond computer science, such as in particle Physics (20), Ultra cold science (21), Condensed matter (22), chemical Physics (23) and conventional microscopy (24, 25).

Example 1

To date, no computational technique is capable of both the characterization and the design of nanostructures. The present Example provides deep neural networks (DNNs) that predict the geometry of nanostructures based solely on their far-field response. This approach also addresses in a direct way the currently inaccessible inverse problem breaking the ground for on-demand design of optical response with applications such as sensing, imaging and also for Plasmon's mediated cancer thermotherapy.

The complexity of the DNN of the present Example deals with the high nonlinearity of the inference task and creates a model that holds a bi-directional knowledge. The present Inventors demonstrated that the DL approach both predicts the spectral response of nanostructures with high accuracy, and address the inverse problem and provides a single nanostructure's design, geometry and dimension, for a targeted optical response for both polarizations. The embodiments described in this Example can be used for designing optimal nanostructures for targeted chemicals and bio-molecules, for example, for the purpose of sensing and integrated spectroscopy.

Some embodiments of the present invention provide a DL architecture that is applied to the design and characterization of metal-dielectric sub-wavelength nano-particles. The present Inventors demonstrated that the training of a bidirectional network that goes from the optical response spectrum to the nanostructures geometry and back is effective for both the design and characterization tasks. This approach allows direct on-demand engineering of plasmonics structures for various applications, including, without limitation, sensing, targeted therapy and the like. Moreover, the predictive capability of the DL model of the present embodiments can also be used for multivariate characterization of nanostructures beyond the diffraction limit.

FIGS. 5A-C are schematic illustrations explaining the concept of deep learning nanophotonics and the inverse problem. FIG. 5A illustrates interaction of light with plasmonic nanostructures. Incoming electromagnetic radiation interacts with man-made sub-wavelength structures in a resonant manner, ultimately leading to an effective optical response where the optical properties for both polarizations of the designed metamaterial are dictated by the geometry at the nanoscale rather than the chemical composition. FIG. 5B illustrates the direct approach and inverse problem. To date the approach enabled by the computational tools available only allow for a direct modeling namely the predicting the optical response in both polarization of a nanostructure based on its geometry, constituent and surrounding media. The inverse problem, where the tool outputs a nanostructure for a input desired optical response, is much more relevant from a designer point of view and currently unachievable in a time efficient way. FIG. 5C maps the feasibility of the design as a function the complexity of the desired spectrum. The more the desired optical response is complex the more unattainable is the solution of the inverse problem. The deep learning approach optionally and preferably bridges this gap and unlocks the possibility to design, at the single nanostructure level, complex optical responses with multiple resonances and for both polarizations.

To demonstrate the paradigm shift enabled by the deep learning approach of the present embodiments, the interaction of light with sub-wavelength structures is considered. The sub-wavelength structures can be, for example, plasmonic nanostructures and metamaterials and composite layered metallic nanostructures embedded in dielectric, allowing the control of the properties of the outgoing light (26).

FIG. 5A illustrates such optical response for both polarizations of the electromagnetic field. The interaction of white light (which contains all the colors) with an array of metallic subwavelength geometries fabricated on a glass substrate, causes partial color transmission due to absorption, which can be different for each polarization of the electromagnetic field. However, due to the diffraction limit, these subwavelength nanostructures cannot be observed by a conventional microscope.

Predicting the far field optical response for a defined nanostructure geometry and composition involves solving the full set of Maxwell equations at each location in space and for each wavelength. However, whereas the far-field spectrum is directly connected to the nanostructure geometry, the inverse problem of inferring the nanoscale geometry from a measured or desired far-field spectrum typically cannot be obtained (see FIG. 5B). For a simple nanostructure, exhibiting single resonance peaks in each polarization, one can solve it semi-analytically or in an intuitive manner (27), however for a general spectral response associated with more complex geometries, no solution is known. Shallow neural networks, evolutionary algorithms and linear regression (13, 15, 28) have gained some success in solving such a task. However, the inventors found that these techniques have low accuracy and practical feasibility and fall short in modeling of nonlinear problems with high complexity of the underlying physical processes (FIG. 5C).

Figure 6A:
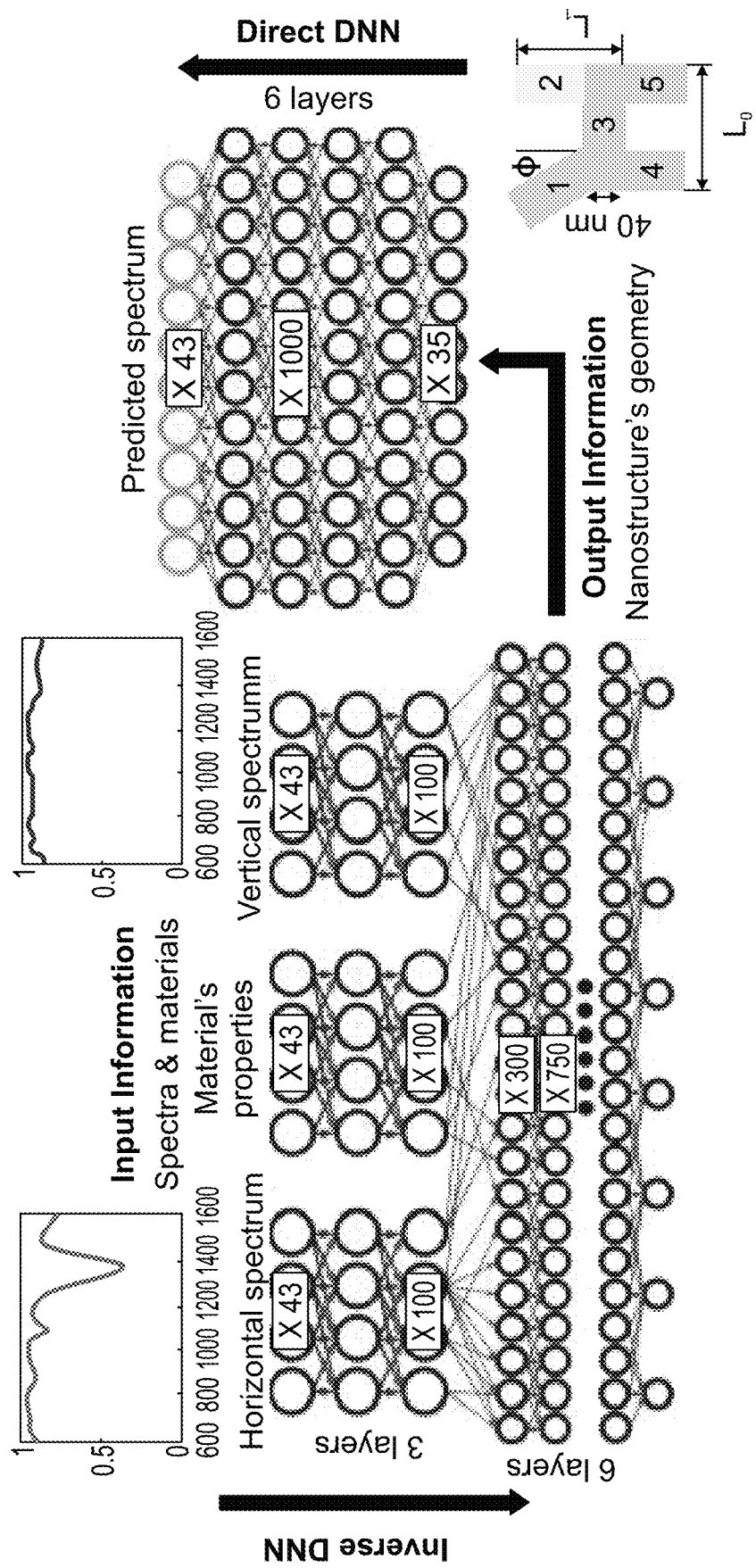
FIGS. 6A-E depicts a deep learning architecture and retrieval of nanostructure's geometry, used in experiments performed according to some embodiments of the present invention.
Figure 6B:
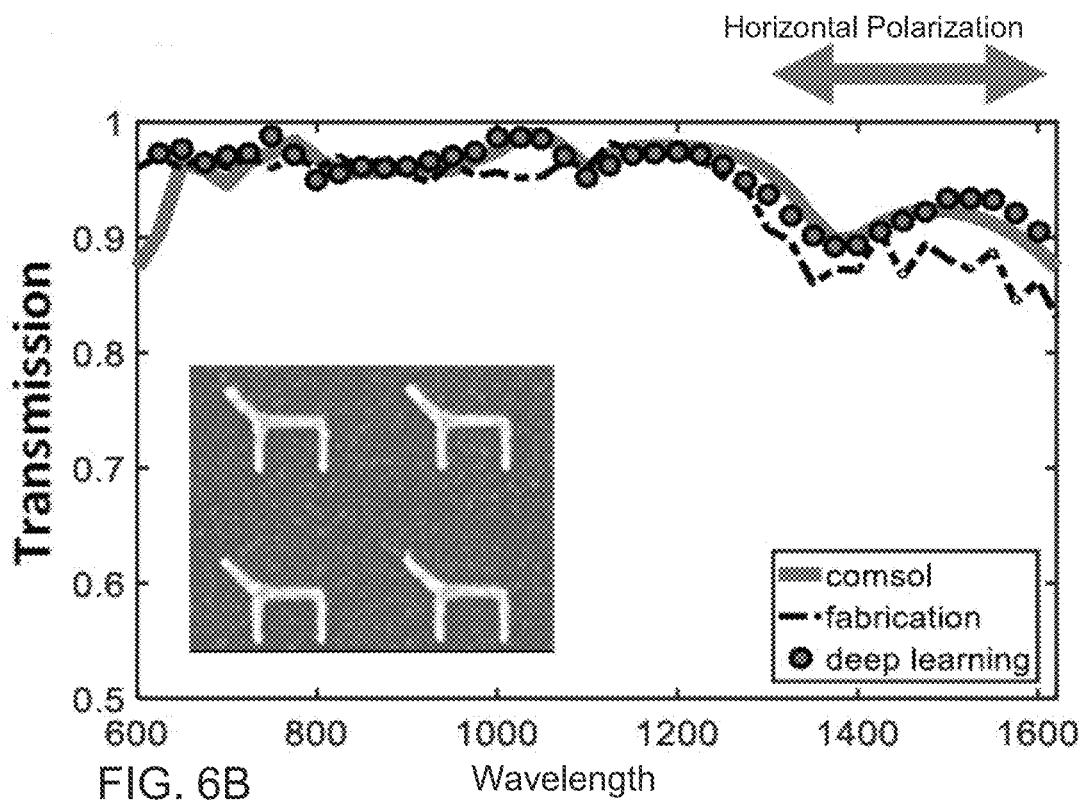
Figure 6C:
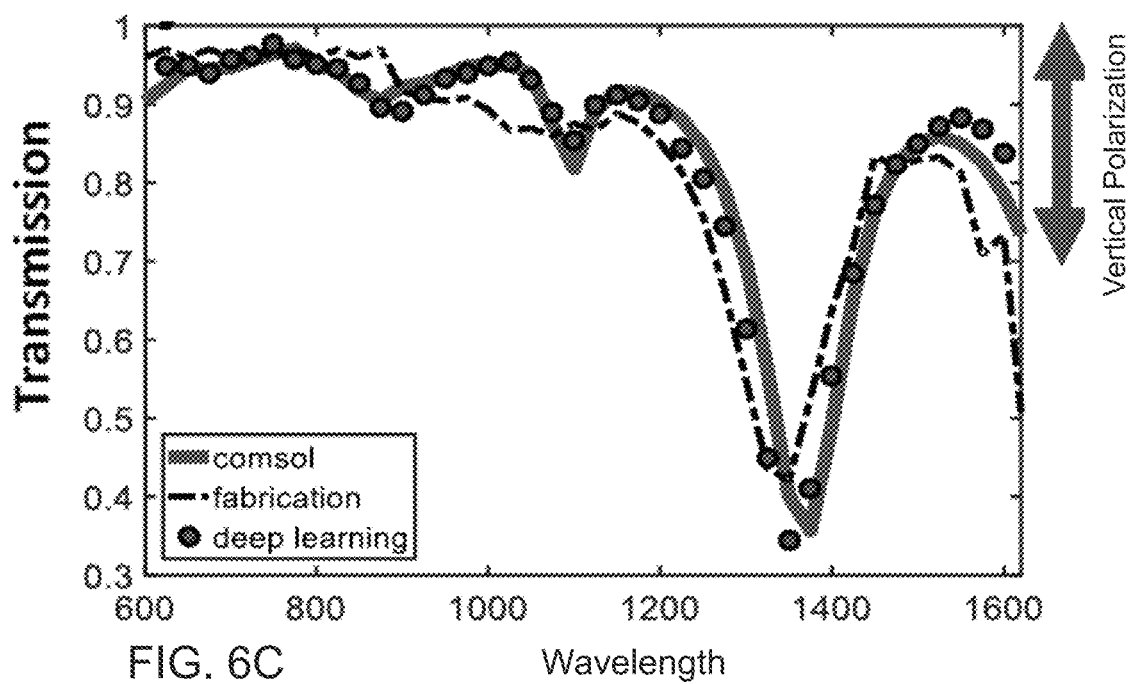
Figure 6D:
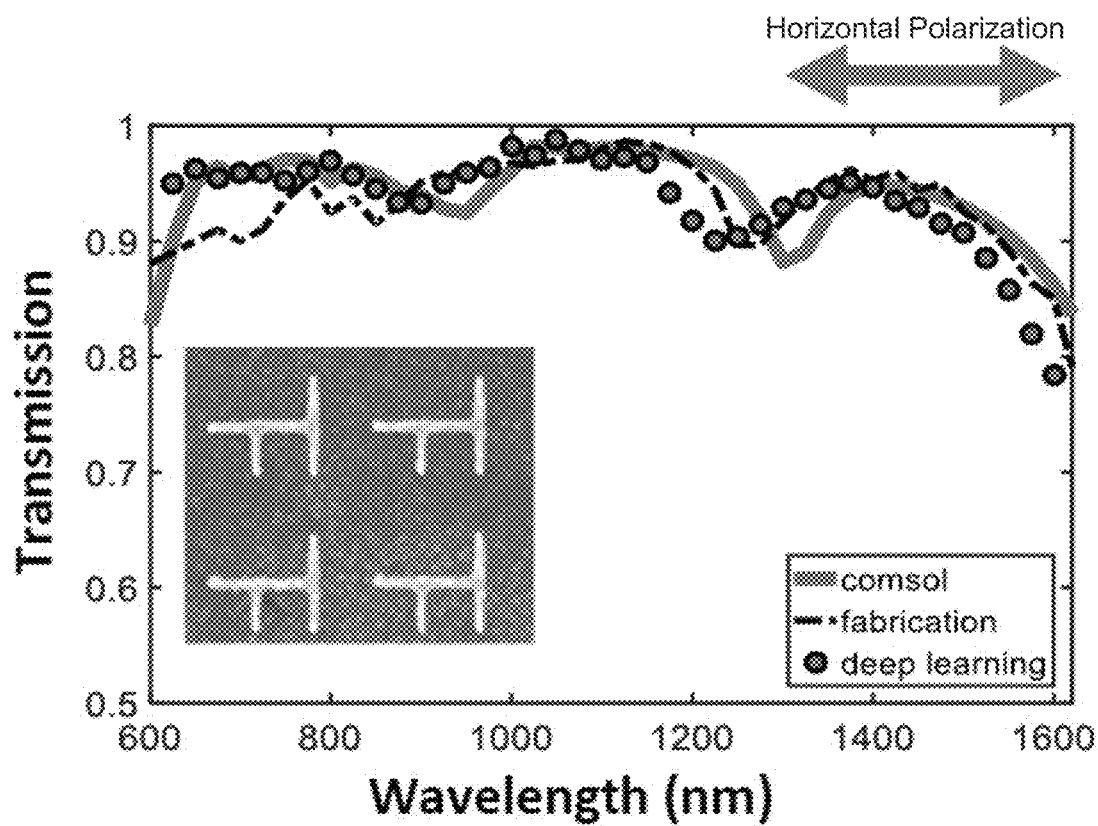
Figure 6E:
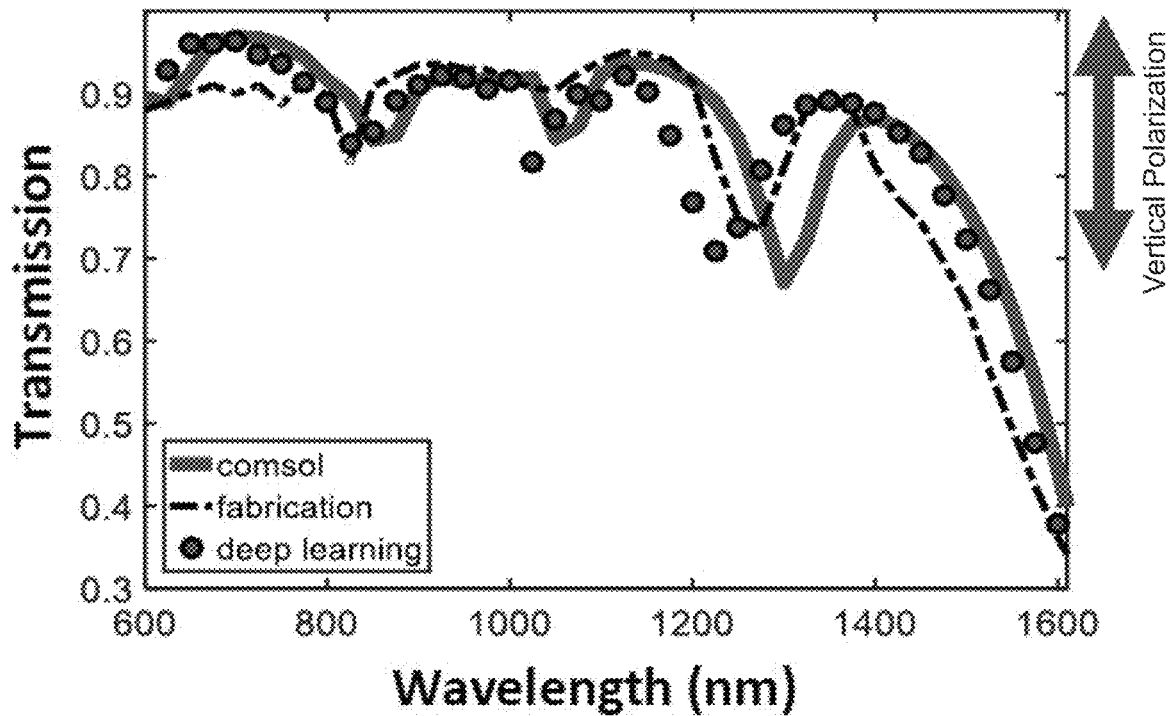

In the present Example, a DL network which uses a fully connected neural network was used. The network included a bi-directional deep neural network architecture composed of two subnetworks (FIG. 6A). The first subnetwork was a Geometry-Predicting-Network (GPN) that predicts a geometry based on the spectra (the inverse path). The second subnetwork was a Spectrum-Predicting-Network (SPN) that predicts the spectra based on the nanostructure geometry (the direct path). The geometry predicted by the GPN was fed into the SPN which, in turn, predicts back the spectrum. Thus, the bi-directional network solves the harder inverse problem first (predicting the geometry based on two spectra for both polarizations), and then, using the predicted geometry, the recovered spectrum is matched with the original spectrum.

The training of the bidirectional network was by a dedicated and non-conventional learning procedure since the input to the SPN is a predicted geometry rather than the actual geometry. The inventors found a significant gain from training one network on all the training sets rather than the alternative of training multiple separate networks.

In order to train the DNN, a large set of synthetic data was created using COMSOL Multiphysics (4). The data contains more than 15,000 experiments, where each experiment is composed of a plasmonic nanostructure with a defined geometry, its metal properties, the host's permittivity and the optical response spectrum for both horizontal and vertical polarizations of the incoming field (see Methods). In the present Example, a nanostructure geometry represented by a general "H" template, was chosen, but other geometries are also contemplated.

FIGS. 6A-E depicts the deep learning architecture and the retrieval of nanostructure's geometry.

FIG. 6A illustrates deep subnetworks that have a cascaded structure of many layers of nonlinear processing units, where each layer uses the output from the previous layer as input. The first part of the inverse subnetwork was composed of three parallel pipelines that contain three layers. The second part of the inverse subnetwork included a sequential network that receives as input, 250 neurons from each part of the parallel subnetwork. It then joins them together and sends them to six layers. The output of the inverse subnetwork with total depth of nine layers was the predicted nanostructure geometry (H shape in the present example) represented by its encoded structure, length sizes and angle. The direct subnetwork receives the predicted geometry as input and the given material properties.

The training of the bidirectional network consists of two phases. In a first phase, the inverse subnetwork is trained to predict the geometry based on the transmission spectrum. In a second phase the direct subnetwork is trained on top of the first subnetwork. The inverse subnetwork receives as input parameters, two spectra and material properties, and for each experiment it learns the corresponding geometry, material properties and resonances of the unknown geometry. The spectra were fed into the subnetwork in a raw form of 43Y (transmission) values, where X values (wavelengths) were fixed.

The output of the direct subnetwork was a transmission graph of 43 regressed values in the range [0,1], and was run twice, once for each polarization. The ReLU activation function (29) was used throughout the network. Once the DNN was trained, the nanostructure's geometry was retrieved based on the measured or desired transmission spectrum by querying the inverse subnetwork. The obtained geometry was then fed into the trained direct subnetwork which computes the predicted transmission spectrum.

A COMSOL simulation with the predicted geometry was also executed. The results of this process for two different fabricated nanostructures are depicted in FIGS. 6B-E, where FIGS. 6B and 6C correspond to a first nanostructure and FIGS. 6D and 6E correspond to a second nanostructure, showing result for horizontal (FIGS. 6B and 6D) and vertical (FIGS. 6C and 6E) input polarization. In FIGS. 6B-E, the measured spectrum is depicted in the dashed line, the DL spectrum based on the predicted geometry is depicted as full circles, and the results of the COMSOL simulations based on the DL predicted geometry are represented as full lines.

Tables 1 and 2, below list the DL predicted geometry, for the first (Table 1) and second (Table 2) fabricated nano structures.

TABLE 1

| Parameter | DL Prediction | Fabrication |
|---|---|---|
| $L_0$ | 251 nm | 270 nm |
| $L_1$ | 237 nm | 224 nm |
| Leg 1 | 1 | 1 |
| Leg 2 | 0 | 0 |
| Leg 3 | 1 | 1 |
| Leg 4 | 1 | 1 |
| Leg 5 | 1 | 1 |
| $\varphi$ | 43° | 45° |

TABLE 2

| Parameter | DL Prediction | Fabrication |
|---|---|---|
| $L_0$ | 242 nm | 275 nm |
| $L_1$ | 217 nm | 224 nm |
| Leg 1 | 1 | 1 |
| Leg 2 | 1 | 1 |
| Leg 3 | 1 | 1 |
| Leg 4 | 1 | 1 |
| Leg 5 | 1 | 1 |
| $\varphi$ | 94° | 90° |

In the H template each of the outer edges can vary in length, angle or can be omitted. Such variable geometry is complex enough to span a wide variety of optical response spectra for both polarizations. The DNN was then fed with these synthetic optical experiments and let it learn the multivariate relationship between the spectra and all of the aforementioned geometric parameters. During this training process, the prediction provided by the DNN on a set of synthetic experiments was compared to the COMSOL solutions and the network weights were optimized to minimize the discrepancy. A set of similarly created samples, unseen during training, was used to evaluate the network's performance.

The DNN ability to accurately predict fabricated nanostructures' parameters beyond simulations was demonstrate by fabricating a set of different geometries encompassing some which the network has never seen. The transmission spectra was measured on a home-built reflection-transmission setup, which included a broadband source, high magnification objectives and collection optics and fiber to an Optical Spectrum Analyzer (see Methods). These measured spectra were fed into the trained DNN and obtained an excellent agreement between the retrieved dimensions and those actually measured by SEM (insets FIGS. 6B and 6D). These excellent predictions were obtained once the DNN was trained with a training set of 1500 simulated experiments where the network was able to learn the different geometries' response in the presence of the measured dispersion of Indium Tin Oxide layer (ITO), see Methods. A particular feature of the technique is that the DNN allows the retrieval of geometrical dimensions beyond the diffraction limit along with optical properties based solely on far-field measurements. This achievement is enabled by the bi-directional architecture of the network and the simultaneous learning process between the GPN and SPN leading to co-adaptation between the subnetworks. Compared to the simultaneous bi-directional training, the performance of the two separately trained GPN and SPN is less preferred.

In accordance with the bi-directionality nature of the network of the present embodiments, the output of the inverse subnetwork serves as an input to the direct subnetwork and is used to predict back the two spectra of the predicted geometry. As an example, the bi-directionality advantage was demonstrated in the case of a dispersive ITO. This advantage is apparent from the Mean Squared Error (MSE) achieved on the error function in the bidirectional approach of the present embodiments and the composite direct (SPN) and inverse (GPN) subnetworks.

The bidirectional network exhibits a significantly lower MSE of 0.16 compared to the MSE achieved with the composite approach (MSE=0.37). In the present Example, the direct subnetwork predicted both spectra using the same weights. The shared weights property provided better results than two different subnetworks with each one specializing in one polarization. This resulted in a significant improvement in predicting each polarization when the DNN also learns the opposite polarization. This has a physical explanation as the free electrons in the nanostructures are occupied in the same 2D boundaries, thus making the two polarizations coupled to each other.

Figure 7A:
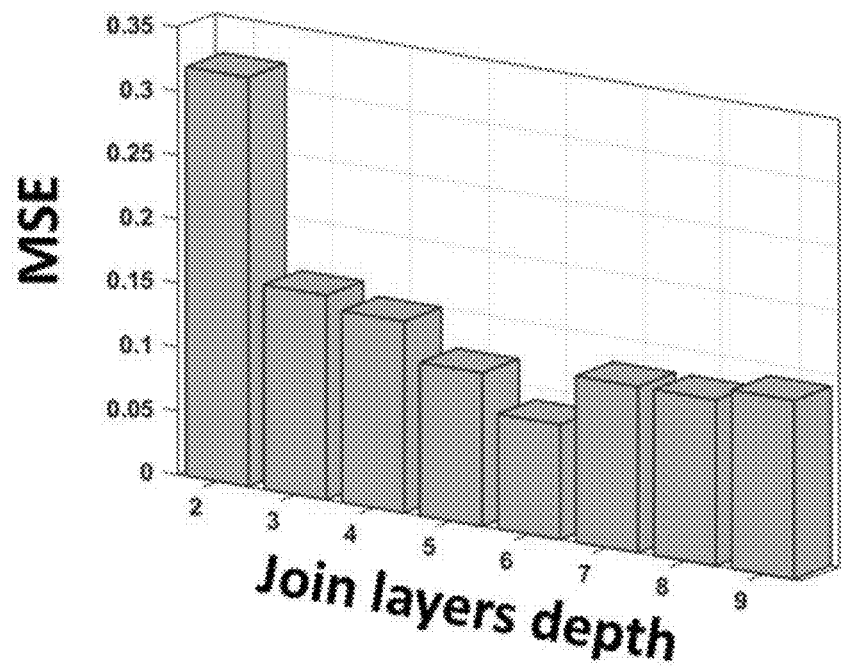
FIGS. 7A and 7B show results of a comparison between different network architectures, obtained in experiments performed according to some embodiments of the present invention.
Figure 7B:
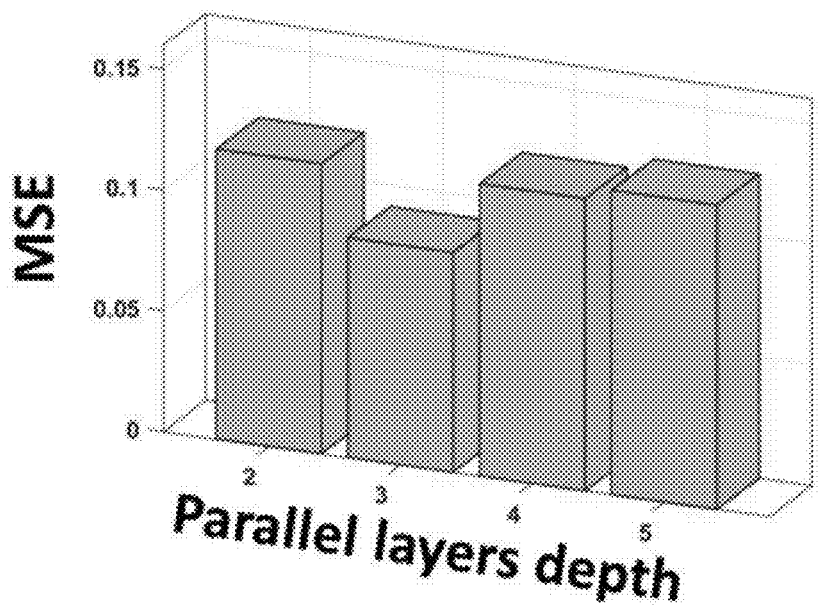

In order to gain insight on the effect of the network's depth on the prediction performance, a comparison between different network architectures was conducted. The present inventors found that the network depth affects the results. The number of fully connected layers at the second part of the inverse network was varied, and a comparison of the results is shown in FIGS. 7A and 7B, are bar graph showing performances of a trained GPN with different architectures. FIG. 7A shows analysis in which the parallel layers number is fixed and the number of fully connected layers (the depth of the join-layers) is varied. In this case, deeper DNN leads to better accuracy. There is a certain depth, (six layers, in the present Example) in which the addition of extra layers does not improve the results or leads to a vanishing gradient phenomena. FIG. 7B demonstrates the advantage of the parallel group layers part of the GPN. As shown, adding parallel layers forces the network to represent each one of the three data groups separately and only then joining them together to one inner representation. Using parallel group layers improves the results.

The data used for generating FIGS. 7A and 7B are provided in Tables 3 and 4, respectively.

TABLE 3

| Depth of Join Layers | MSE |
|---|---|
| 9 | 0.14 |
| 8 | 0.13 |
| 7 | 0.13 |
| 6 | 0.09 |
| 5 | 0.12 |
| 4 | 0.15 |
| 3 | 0.16 |
| 2 | 0.32 |

TABLE 4

| Depth of Parallel Layers | MSE |
|---|---|
| 5 | 0.126 |
| 4 | 0.121 |

TABLE 4-continued

| Depth of Parallel Layers | MSE |
|---|---|
| 3 | 0.09 |
| 2 | 0.12 |

Thus, in some preferred embodiments of the invention the inverse subnetwork architecture includes three parallel group layers followed by six sequential fully connected join layers. The present inventors found a significant gain in accuracy when using six join layers compared to five or seven layers in the sequential part of the network. The benefit of such a deep network can be directly derived from the complexity and nonlinearity of the underlying physical process. A significant gain was achieved from training one network on all of the training set over the alternative of training multiple separate networks. This effect appears to be more dominant than a so-called transfer of knowledge (30) effect where knowledge learned from one problem is transferred to another.

Next, the strength of the inverse predictive approach was examined for the case of sensing applications, where plasmonic nanostructures are used for enhance the light-matter interaction with various chemicals and bio-molecules. Organic compounds typically exhibit pronounced resonances across the spectrum from ultraviolet to mid-infrared. The inventors showed that the trained DNN allows finding the nanostructure configuration to best interact with a given molecule with target multiple resonances in the two polarizations.

In the present Example, a nanostructure targeted to enhance the interaction with dichloromethane was designed. Dichloromethane is an important chemical used in industrial processes. This organic compound exhibited one resonance at about 1150 nm and another at from about 1400 to about 1500 nm. The design goal was to achieve a nanostructure that resonates in a water solution (n=1.33) at both wavelengths for one polarization and has different resonances at the orthogonal polarization, at about 820 nm (match a Ti:Sapphire femtosecond laser excitation for a pump-probe experiment), about 1064 nm and about 1550 nm. Another nanostructure that was designed is asymmetrical Phthalocyanine dimer 1a, a synthetic molecule which has more complex polarization characteristics, with potential applications due to its charge transfer properties.

In the conventional design techniques, such designs task would require the process to iterate through different designs using the standard FEM or FDTD simulation tools, a process that can be extremely time consuming. The DNN's inverse solution of the present embodiments yields, in few seconds, the required parameters.

For both molecules, after prediction of the geometry, COMSOL simulations were performed, showing an excellent agreement with the desired spectra. This design approach can be extended to other molecules for biology, chemistry or material sciences.

Figure 8A:
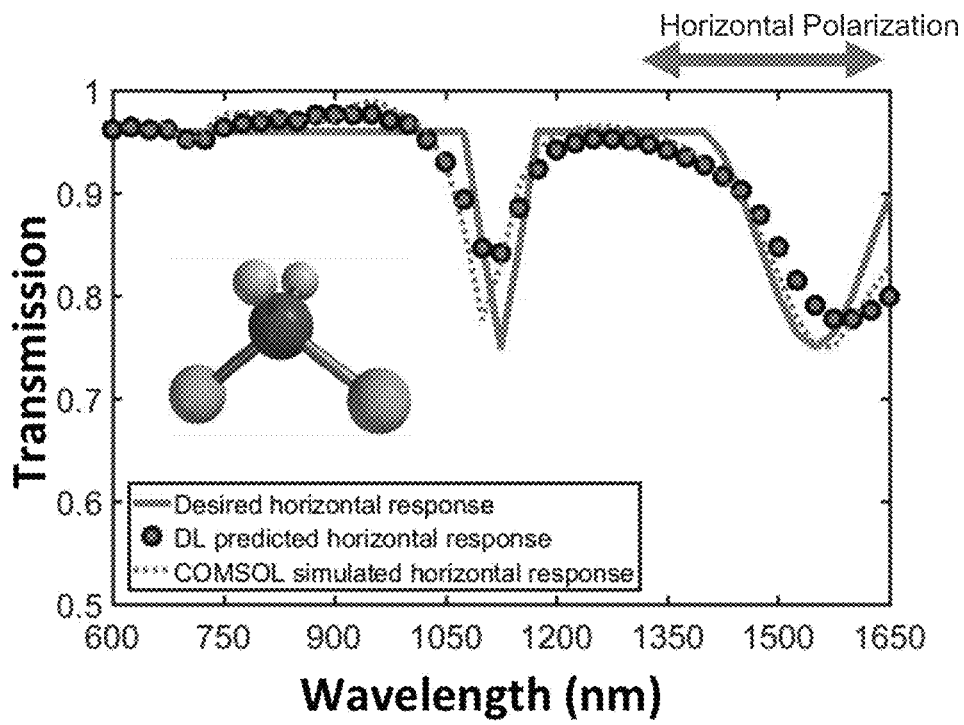
FIGS. 8A-F show prediction results of a nanostructure's geometry obtained in experiments performed according to some embodiments of the present invention.
Figure 8B:
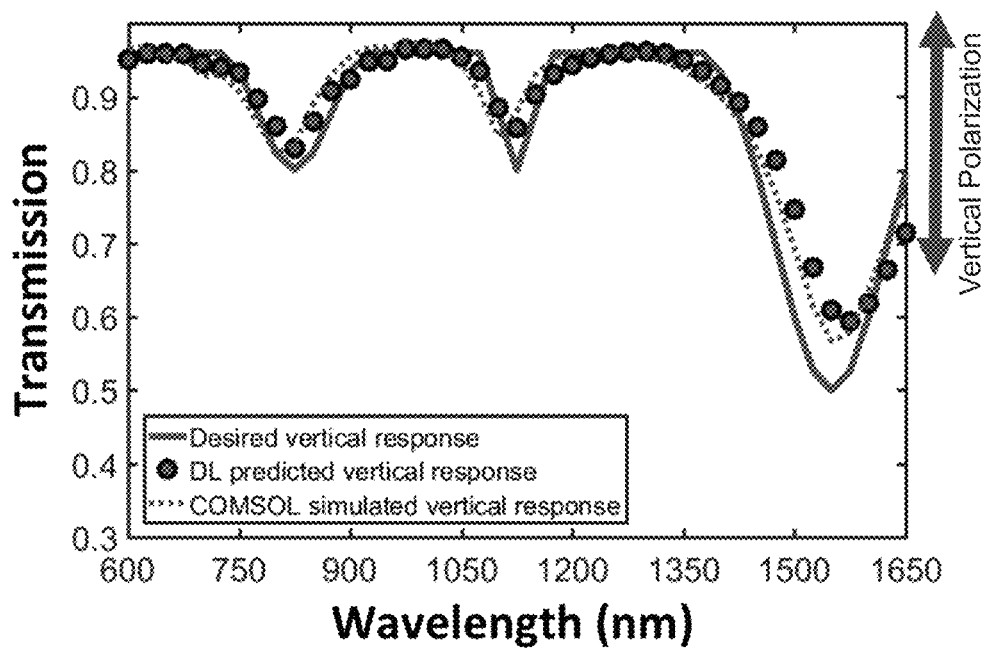
Figure 8C:
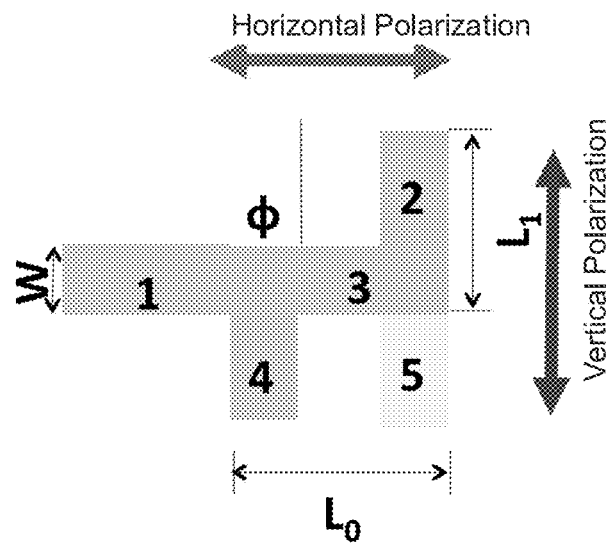
Figure 8D:
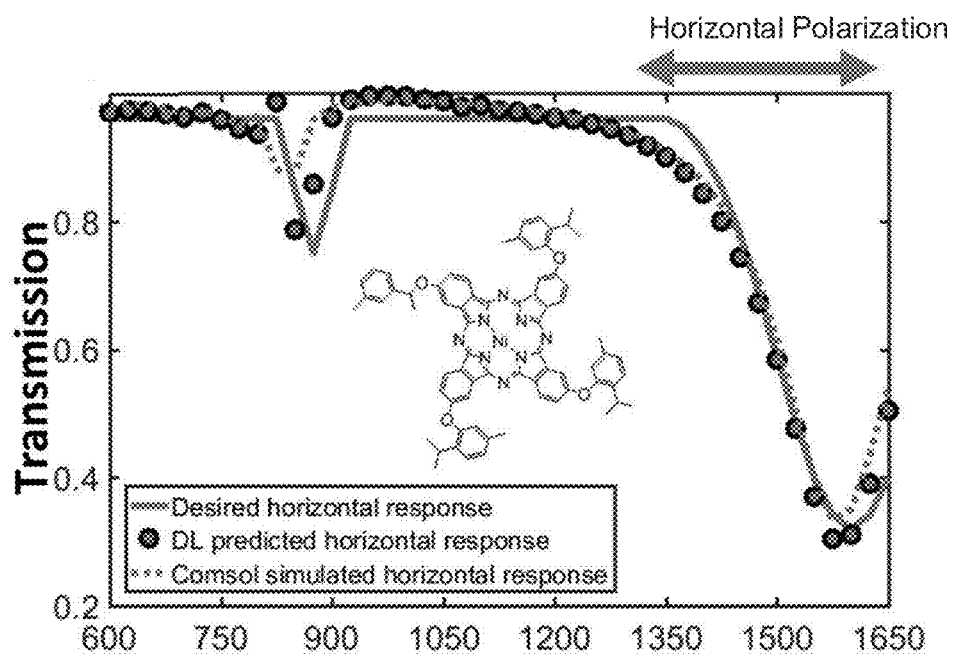
Figure 8E:
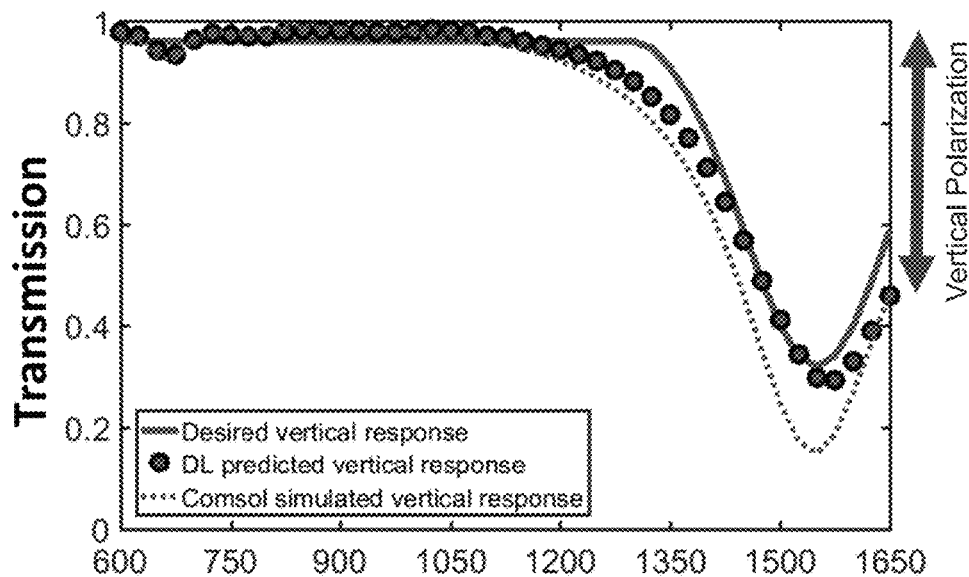
Figure 8F:
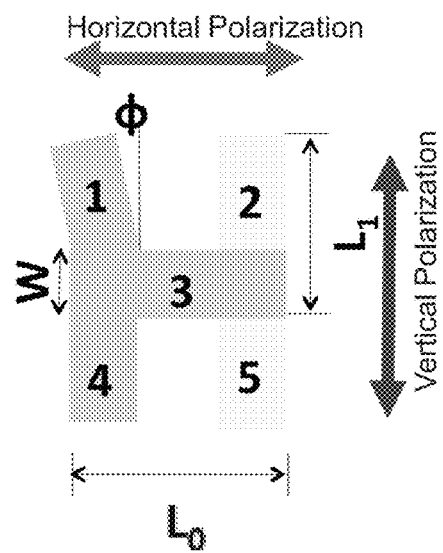

FIGS. 8A-F show prediction results of the nanostructure's geometry for chemical sensing, as obtained in the experiments. FIGS. 8A-C correspond to the dichloromethane molecule, and FIGS. 8D-F correspond to the phthalocyanine molecule, where FIGS. 8A-B and 8D-E and show the desired (solid line), DL predicted (circles) and COMSOL simulated (dotted line) response to horizontal (FIGS. 8A and 8D) and vertical (FIGS. 8B and 8E) polarized input, and FIGS. 8C and 8F illustrates the configuration and dimensions of the plasmonic nanostructure found by the DNN. In FIGS. 8C and 8F, contrasted color represents existing segment ("1") and pale color represents non-existing segment ("0").

Tables 5 and 6, below list the DL predicted geometry, for the dichloromethane (Table 5) and phthalocyanine (Table 6) nanostructures.

TABLE 5

| Parameter | Value |
|---|---|
| $L_0$ | 186 nm |
| $L_1$ | 184 nm |
| Leg 1 | 1 |
| Leg 2 | 1 |
| Leg 3 | 1 |
| Leg 4 | 1 |
| Leg 5 | 0 |
| $\phi$ | 92° |

TABLE 6

| Parameter | Value |
|---|---|
| $L_0$ | 230 nm |
| $L_1$ | 208 nm |
| Leg 1 | 1 |
| Leg 2 | 0 |
| Leg 3 | 1 |
| Leg 4 | 1 |
| Leg 5 | 0 |
| $\phi$ | 6° |

FIGS. 8A-F demonstrate the capability of the DNN of the present embodiments to address various targeted resonances in different polarizations and emphasizes that this approach can be extended to other molecules for sensing in biology, chemistry and material science.

Methods

Sample Preparation

ITO covered glass (Sigma Aldrich) were covered with PMMA-A4 polymer and spin-coated for one minute at 7,000 RPM. The electron beam (Raith150) used was 10 kV beam, 20 μm aperture, 6 mm WD and a 350 pC/cm dose was deposited in single-pixel lines. Samples were then developed in MIBK/IPA (1:3) for 1 minute and rinsed in isopropanol for 20 seconds. 40 nm of gold were then evaporated on the sample with E-Beam Evaporator (VST evaporator). Lift-off was done with acetone and followed with a final wash in isopropanol.

Sample Characterization

Sample sizes were verified using an electron microscope and were optically characterized using an OSL2 Broadband Halogen Fiber Optic Illuminator (Thorlabs) light-source and LPNIR050 (Thorlabs) broad band polarizer. Transmitted light was filtered in an imaging plane by an iris such that only light which passed through the sample was collected and then analyzed by a AQ6370D (Yokogawa) spectrometer.

COMSOL Simulation

Finite element method (FEM) simulations were performed using the 'Electromagnetic Waves, Frequency Domain' module of the COMSOL 4.3b commercial software was utilized. For consistency, the edges were made using fillets with the constant radius of 15 nm. Geometries based on a five edges shape of 'H' have considered. The angle of one of the edges, the existing edges and the edges lengths were varied.

The nanostructure was simulated in a homogeneous dielectric medium with a chosen real effective-permittivity. For preventing reflections from the far planes, PMLs with a depth of the maximum wavelength were placed on both far ends of the homogeneous medium in the propagation direction of the radiating field.

For the dataset predicting the fabrications, the nanostructure was made of Gold with a wavelength dependent homogeneous medium permittivity ($\epsilon_d (\lambda)$) such that $\epsilon_d (\lambda) = \frac{1}{2} (\epsilon_{ITO} (\lambda) + \epsilon_{AIR})$[S1], where $\epsilon_{AIR}$ stands for the air permittivity and equals 1 and $\epsilon_{ITO} (\lambda)$ is the ITO permittivity and is wavelength dependent such that its imaginary part can be neglected in the measured spectrum range. A justification for ignoring the glass permittivity can be found in [S2] and [S3]. In [S2] it was shown that changes in the thickness of a Titanium adhesion layer higher than 40% of the nanostructures height, doesn't affect the plasmon resonance. In [S3] it was shown that for an Au nanostructure with diameter of 10 nm and a graphene layer, the LSPR shifting saturates when the distance is more than 20 nm.

A prediction for a similar behavior of the ITO layer is assumed. In our case, the ITO thickness is about 100 nm which is about 250% of the nanostructure thickness of about 40 nm.

Further Information of the DL Network
Architecture

The bi-directional deep neural network architecture is composed of two networks. The first network is responsible for predicting a geometry, and the second network predicts the spectrum of the predicted geometry. Both networks consist of fully connected layers that have rectified linear units (ReLUs, with activation function max(0, x)). The input to the first network consists of three groups of data:

1. Desired spectrum for X polarization, represented as a vector of 43 samples in the range of 650 nm-1650 nm 2. Desired spectrum for Y polarization, represented as a vector of 43 samples in the range of 650 nm-1650 nm 3. The materials' properties, represented as a vector of 25 parameters, corresponding to six BB oscillators.

The first network uses a parallel architecture of three fully connected layers, where each layer receives as an input from only one group out of the three above, i.e. each group of data is being fed into a different layer, which causes us to name them "group layers". The neurons of the three group layers are then concatenated together to one "joint layer" that is followed by another seven fully connected joint layers. The last layer of these eight joint layers is composed of eight neurons that encode the predicted geometry. The second network is composed of eight fully connected layers that receive as an input the eight output values of the first network, the materials' properties and a flag that indicates the polarization. The last layer of the network consists of 43 neurons where each one of them represents the Y value of the transmission graph in predefined and fixed wavelength values (in this paper, we focused on 43 wavelength data points in the range 650 nm-1650 nm).

Training

The network is trained to minimize the mean squared error (MSE) between the predicted spectra and geometry to their ground truths. These spectra and geometry are vectors in which each value was normalized separately, so they have a zero mean and a standard deviation of 1. This was done to reduce the influence of parameters with big values compared to parameters with relatively small values like the transmission ratio (which is a number between 0 and 1). Adadelta is used as an optimization method, and seems very helpful in reducing the sensitivity of the learning process to the exact learning rate used. A batch size of 64 is used throughout our experiments, since it seems to lead to better performance in preliminary experiments. As mentioned above, the output vector is used to predict both polarizations, based on a binary flag that selects the desired one. We, therefore, train the second network with a batch size that is twice the batch size of the first network, using each training sample twice. About 3000 epochs are performed in total until we receive the most optimized network with the best accuracy. The training takes around two hours in order to get the best results and approximately a half hour in order to get moderate results.

Dataset

The dataset used consists of 3K simulated samples, each sampled according to 12 different nanostructure geometries. Each class of geometry has different edge length/angle/material properties. The experiments were composed of four different materials, and each experiment has two graphs of transmission per wavelength, one for each polarization. The wavelengths are fixed in the range of 600 to 1650 with a step size of 25 nm and the transmission is a value between 0 to 1 indicating the percentage of light that was transmitted through the nanostructure. A total of 80% of the samples are used for training, 5% for validation, and the remaining samples for testing.

Bidirectional Neural Networks

The SPN can be viewed as mapping of geometry to a spectrum, and the GPN can be viewed as mapping from spectrum to geometry. Given a pair of desired spectra, the GPN optionally and preferably provides a geometry and the SPN optionally and preferably provides its spectra. However, for two separate networks, there is no guarantee that the two spectra predicted using the SPN applied to the predicted geometry would closely match the original spectra. In other words, there may be some drift when going back and forth. Since during the design process, one is likely to adjust both the geometry and the shape of the spectrum to account for various constraints, this drifting may hinder the effectiveness of the process.

Thus, according to some embodiments of the present invention one network that contained both SPN and GPN was trained in order to optimize them together so they co-adapt to each other. This process is referred to as co-adaptation of networks. The (harder) inverse problem was solved first, and then, the predicted geometry was used to make sure that the recovered spectrum matches the original one. Training this type of a network requires a dedicated procedure since the input to the second half of the network is a predicted geometry and not the true geometry that is known to produce the spectrum. During the training procedure, one forward was performed on the GPN, then the output was cloned to create two queries for each experiment: one for each polarization. These two queries are different in one flag indicating the relevant polarization. Since batch learning was used, it was we performed on the entire batch and a double sized batch was created for the SPN. Forward was then performed on the SPN by feeding it with the GPN output. At the end, the two networks were backward, and a loss was calculated for each one. The loss was summed and sent to the optimizer with the gradients of both networks.

A few training operations led to better results and time to converge. The first was doing the backward on the SPN only after a predefined amount of epochs, when the GPN becomes stable with moderate results. With each epoch, performing a few extra epochs without doing backward on the GPN led to better results. This means that the SPN was given more than one epoch to adjust to each GPN hypothesis during the training. Pre-trained SPN and GPN networks were initialized separately, and their training was started together leading to better total loss in a few epochs.

Loss Function

The loss function that was use is a $$Loss = MSE(predictedGeometry, groundTruthGeometry) + MSE(predictedSpetrumX, groundTruthSpectrumX) + MSE(predictedSpetrumY, groundTruthSpectrumY)$$

Where predictedGeometry is the output of the GPN and groundTruthSpectrumX and PredictedSpetrumY are both the output of the SPN.

Figure 9A:
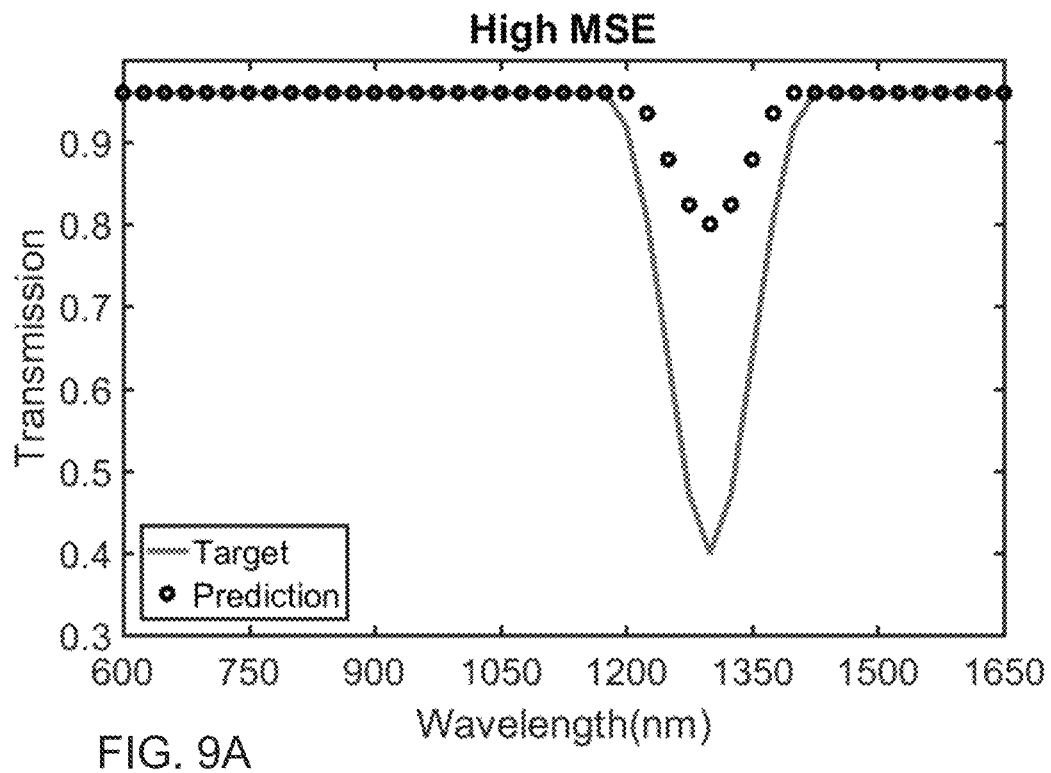
FIG. 9A shows an example of a spectrum prediction with a high Mean Squared Error.
Figure 9B:
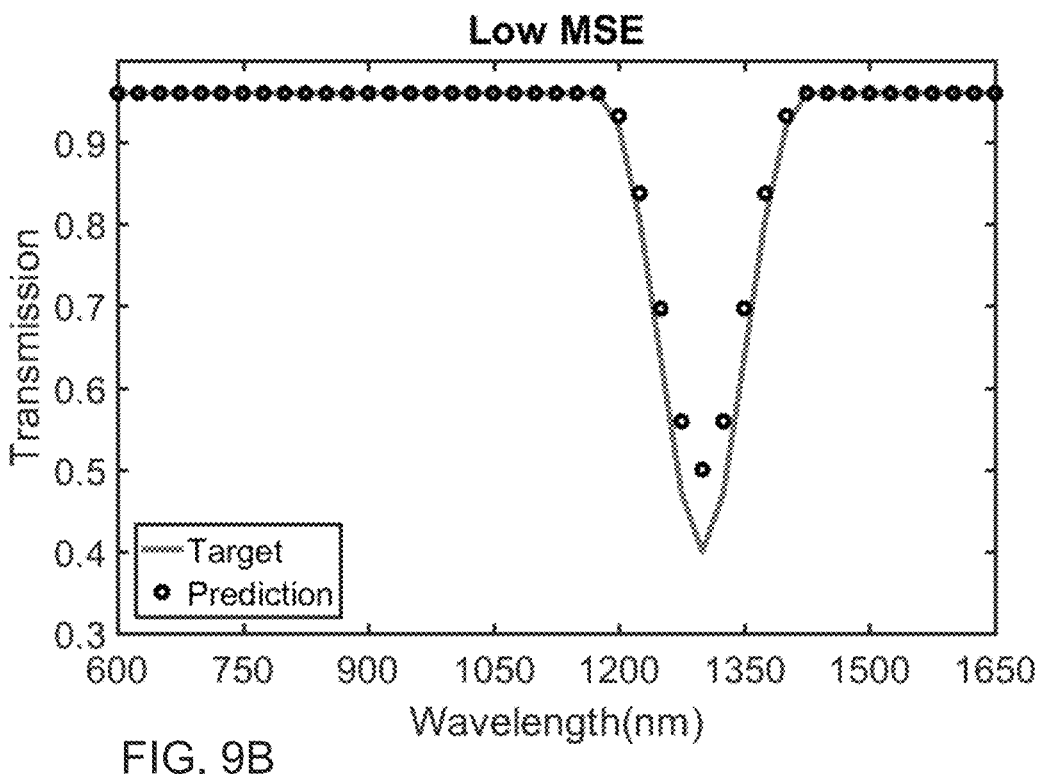
FIG. 9B shows an example of a spectrum prediction with a low Mean Squared Error.

FIG. 9A shows an example of a spectrum prediction with a high MSE (poor DL prediction), and FIG. 9B shows an example of a spectrum prediction with a low MSE (good DL prediction).

This Example demonstrated a deep-learning architecture that is capable of predicting the geometry of nanostructures based solely on the far-field response of the nanostructures. The network allows an accurate prediction of the geometry of a complex nanostructure and can be extended to other physical and optical parameters of the host materials and compounds.

The approach also effectively addresses the currently inaccessible inverse problem of designing a geometry for a desired optical response spectrum and also significantly speeds up the direct spectrum prediction of such sub-wavelength structures. The designed nanostructures can be used in many applications such as, but not limited to, as sensing, imaging and also for Plasmon's mediated cancer thermotherapy.

Example 2

Figure 10A:
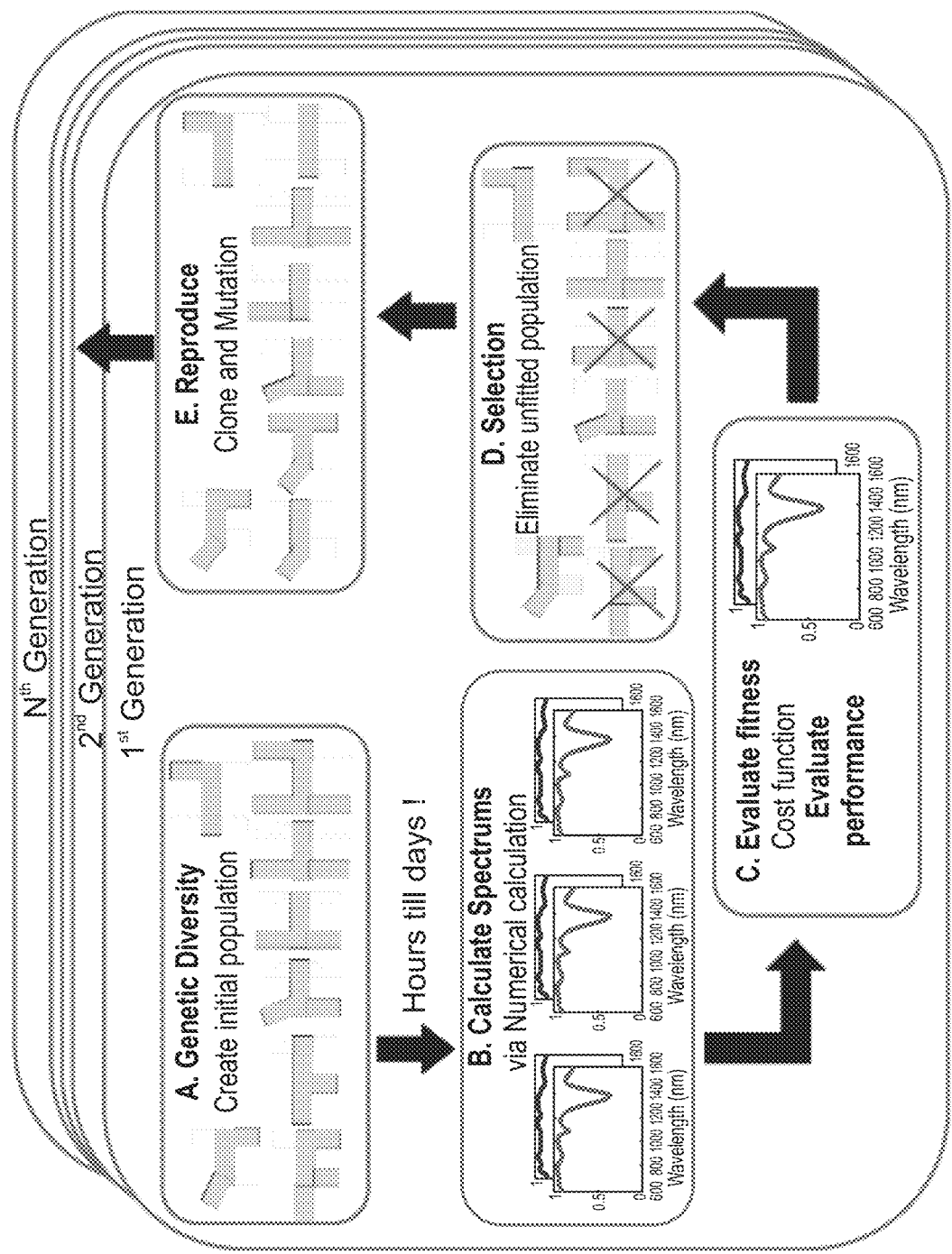
FIG. 10A is a schematic illustration explaining a Genetic Algorithm (GA)

The inverse problem of designing a nanostructure with an on-demand optical response, is currently an optimization problem requiring hundreds to several thousands of iterations for a single design task even with the most advanced algorithms (such as evolutionary or topology optimization algorithms) and numerical tools. FIG. 10A illustrates a Genetic Algorithm (GA) applied to the field of predicting nanophotonics geometries and their responses. The GA contains five phases: A. Create the genetic diversity that serve as initial population of various nanostructures, B. Calculate spectrum for each configuration. It was found by the Inventors of the present invention that this is a time-consuming task for complex nanostructures. C. Evaluate Fitness. D. Selection: elimination of the least fit. The population is examined to find the set number of top scores, and any solution with poorer fitness score is eliminated from the population. E. Reproduction: clone and mutate the most fitted structures. The frequency and type (Deletion, addition, variations, etc.) of mutations can vary. The output of the best fit sample found throughout the generations. GA is a classic example of optimization algorithms where a multidimensional space is searched for each and every design tasks.

Figure 10B:
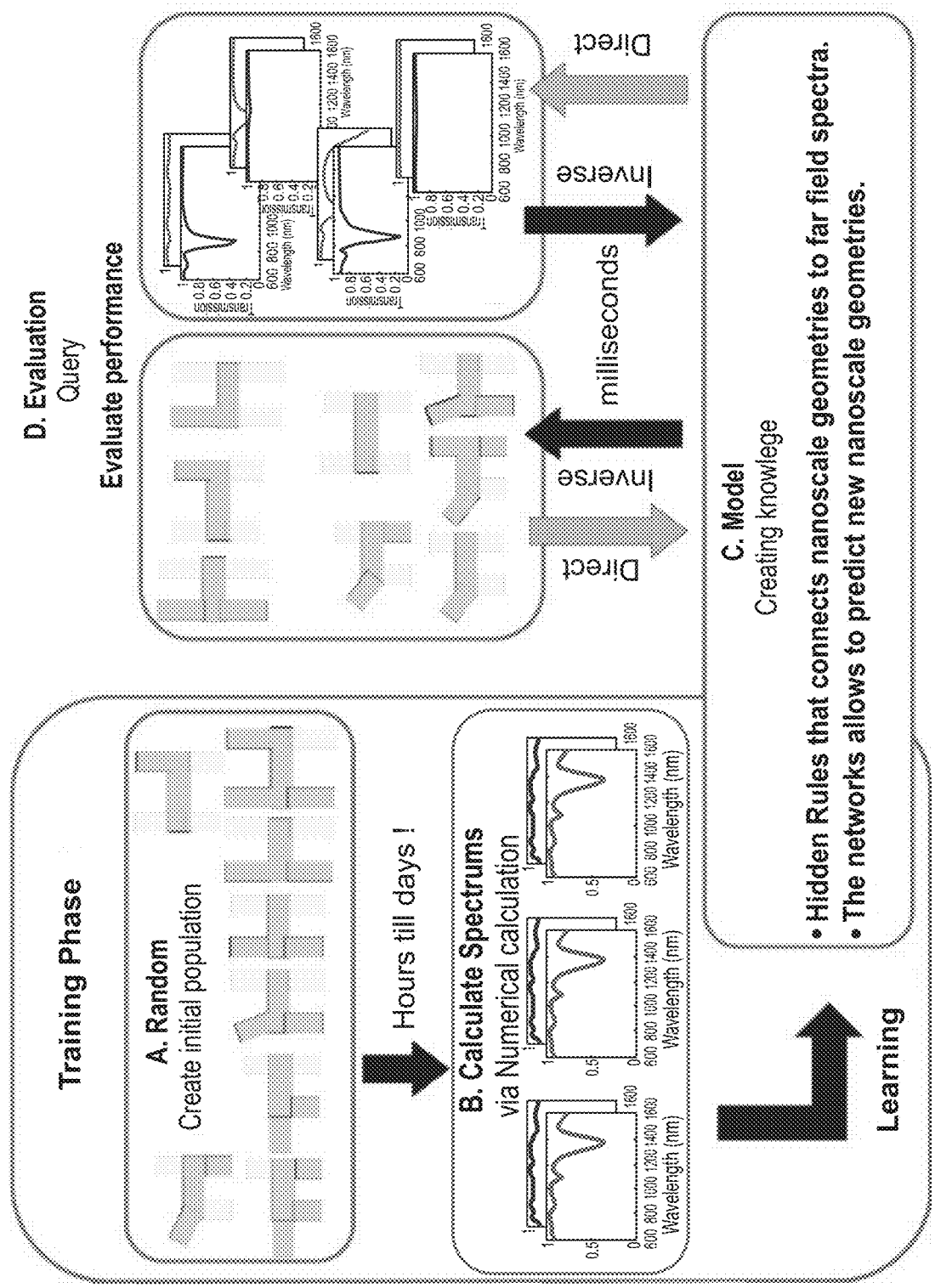
FIG. 10B is a schematic illustration explaining a Deep Learning technique used in experiments performed according to some embodiments of the present invention.

FIG. 10B illustrates a DL technique which can be used according to some embodiments of the present invention. This technique can contain four phases: A. create a dataset with diverse experiments, B. Calculate spectrum for each configuration. This is a timely task for complex nanostructures. C. Learn an optimized model using the dataset. D. Query the trained model with new experiments. In order to predict beyond the train data, the network learns the inner set of rules of the nanostructure optical response phenomena. This approach can therefore be considered as an optimization once for all. Once the inner set of rules is learned, the query phase is extremely fast and accurate.

A particular distinction between the technique of the present embodiments and stochastic optimization algorithms is that the DNN of the present embodiments is a learning network that employ optimization during training, while stochastic optimization and evolutionary algorithms use optimization for performing search in a high dimensional parameter space. Thus there is a fitting step for each query, so that scaling of the optimization algorithms to 3D geometries is not feasible using the genetic algorithms whereas the DNN of the present embodiments allows it.

The DNN of the present embodiments can thus deal with the high nonlinearity of the inference task and creates a model that holds a bi-directional knowledge. The DNN of the present embodiments is applied in this Example to the design and characterization of metal-dielectric sub-wavelength nanostructures. As shown below, the approach of training a bidirectional network that goes from the optical response spectrum to the nanostructure geometry and back is more effective for both the design and characterization tasks. The DL approach of the present embodiments is not only able to predict the spectral response of nanostructures with high accuracy, but is also able to address the inverse problem and provide a single nanostructure's design, geometry and dimension, for a targeted optical response for both polarizations. This Example further discusses the DNN's retrieval performance versus a retrieval based on genetic algorithms (GA). As will be shown below, the DNN retrieval outperforms state-of-the-art GA.

Methods

The interaction of light with sub-wavelength structures such as plasmonic nanostructures and metamaterials and composite layered metallic nanostructures embedded in dielectric, allows controlling of the properties of the outgoing light. The interaction of white light with an array of metallic subwavelength geometries fabricated on a glass substrate, causes partial color transmission due to absorption, which can be different for each polarization of the electromagnetic field. Due to the diffraction limit, these subwavelength nanostructures cannot be observed by a conventional microscope.

In this Example, the artificial neural network described in Example 1 has been employed.

In order to train the large set of synthetic data using COMSOL Multiphysics was created. The data contained more than 15,000 experiments, where each experiment was composed of a plasmonic nanostructure with a defined geometry, its metal properties, the host's permittivity and the optical response spectrum for both horizontal and vertical polarizations of the incoming field. While the thickness of the nanostructure was maintained constant, it can influence the transmission spectra (blue shift and resonance strength). This can be added as a parameter to the learning dataset and allow refined predictions. A nanostructure geometry represented by a general "H" form, where each of the outer edges can vary in length, angle or can be omitted has been chosen in this Example. This subset contains an extremely large numbers of different configurations spanning rich spectra combinations featuring one to several resonances for the two orthogonal incident polarizations. This subset has a lower boundary of at least 1.1 billion different geometries different material constituents and environments, most of them cannot be determined in any analytical or semi analytical model or an intuitive prediction.

The DNN was fed with these synthetic optical experiments and was allowed to learn the multivariate relationship between the spectra and all of the aforementioned geometric parameters. During this training process, the prediction provided by the DNN on a set of synthetic experiments was compared to the COMSOL solutions and the network weights were optimized to minimize the discrepancy. A set of similarly created samples, unseen during training, was used to evaluate the network's performance.

The ability of the DNN of the present embodiments to accurately predict fabricated nanostructures' parameters beyond simulations, was demonstrated by fabricating a set of different geometries encompassing some which the network has never seen. ITO covered glass (Sigma Aldrich) was covered with PMMA-A4 polymer and spin-coated for one minute at 7,000 RPM. The electron beam (Raith150) used was 10 kV beam, aperture, 6 mm WD and a dose was deposited in single-pixel lines. Samples were then developed in MIBK/IPA (1:3) for 1 minute and rinsed in isopropanol for 20 seconds. Gold was then evaporated on the sample with E-Beam Evaporator (VST evaporator). Lift-off was done with acetone and followed with a final wash in isopropanol.

The transmission spectra were measured on a home-built reflection-transmission setup, which includes an OSL2 Broadband Halogen Fiber Optic Illuminator (Thorlabs) light-source and LPNIR050 (Thorlabs) broad band polarizer. Transmitted light was filtered in an imaging plane by an iris such that only light which passed through the sample was collected and then analyzed by a AQ6370D (Yokogawa) spectrometer. These measured spectra were fed into the trained DNN and an excellent agreement between the retrieved dimensions and those actually measured by SEM were obtained as shown in Example 1, above.

These predictions were obtained once the DNN was trained with a training set of 1500 simulated experiments where the network was able to learn the different geometries' response in the presence of the measured dispersion of the Indium Tin Oxide layer (ITO). The DNN of the present embodiments allows the retrieval of geometrical dimensions and optical properties of a subwavelength geometry from the family of the subwavelength H-geometries that reproduce its far-field spectra. This is an unmatched capability of multivariate parameters retrieval beyond extrapolation.

Discussion

From the bi-directionality nature of the network of the present embodiments, the output of the inverse network served as an input to the direct network and was used to predict back the two spectra of the predicted geometry. As an example, the bi-directionality advantage was demonstrated in the case of the dispersive ITO. This advantage was apparent from the Mean Squared Error (MSE) achieved on the error function in both approaches (bidirectional versus composite direct & inverse networks). The bidirectional network of the present embodiments exhibited a significantly lower MSE of 0.16 compared to the MSE achieved with the composite approach (MSE=0.37). The direct network was able to predict both spectra using the same weights. The shared weights property gives better results than two different networks with each one specializing in one polarization. This results in a significant improvement in predicting each polarization when the DNN also learns the opposite polarization. This has a physical explanation as the free electrons in the nanostructures are occupied in the same 2D boundaries, thus making the two polarizations coupled to each other.

In order to gain insight on the effect of the network's depth on the prediction performance, a comparison between different network architectures was conducted. The number of fully connected layers was varied at the second part of the inverse network and by comparing the results to each other, a significant effect on the accuracy of the prediction was observed, as shown in FIGS. 7A and 7B, and Tables 3 and 4. The best inverse network architecture for the present Example was three parallel group layers followed by six sequential fully connected join layers. A significant gain in accuracy was observed when using six join layers compared to five or seven layers in the sequential part of the network. The benefit of such a deep network is directly derived from the complexity and nonlinearity of the underlying physical process.

The depth of the DNN is not a mere technical detail when comparing to a classical shallow network that has only one to two hidden layers, the latter completely fails at the prediction task with a MSE over 0.6, meaning that there is very little correlation between the neural network prediction and the actual spectrum. A significant gain from training one network on all of the training set over the alternative of training multiple separate networks was surprisingly and unexpectedly observed.

Genetic algorithm is an optimization method that is inspired by natural selection. Such an algorithm can be used to solve optimization tasks by searching for a good solution among many possible solutions, with regard to a pre-defined set of constraints. This task is further defined by a fitness function that measures the quality of a candidate solution. The target is to find a solution that maximizes the fit function subject to the constraints. In order to find a good solution, the algorithm evolves generations of possible solutions. At the beginning of the process, the algorithm starts with a random set of simple solutions, it evaluates each one of them, and then it chooses who will be carried over to the next generation and how. Some possible solutions can move with no change to the next generation, some are randomly mutated and some are randomly matched with other solutions thus creating a new descendant candidate.

In each generation, all the possible solutions are evaluated in order to search for the best fit and the process terminates when a good solution was found, or a predefined threshold of the amount of generations was reached. It was found by the Inventors that genetic algorithms are unsuitable for tasks where the computation of the fitness function is computationally demanding. The algorithm relies on evaluating every single possible candidate in every generation, and when evaluation time is demanding the process become intractable.

In the task of this Example, due to the complexity of the underlying physics, there is no analytical way to evaluate a candidate solution. Evaluating a single spectrum of a given 3D geometry for both polarizations for that wavelength range takes at least a minute to several tens of minutes even using efficient scattering calculations such as the Discrete Dipole Approximation. This practical simple runtime constraint makes Genetic Algorithm not relevant to this type of task (because each generation is composed of hundreds or thousands of experiments that demands hours of computations for each generation, and days for a single design task).

In comparison to evolutionary algorithms and other similar stochastic optimization methods, the Deep Learning employed by the present embodiments optimizes a generic model during the training process. Although there may be a relatively long training process, using the network to predict new samples takes much less than one second. In the present Example, the network training took up to 3 hours. When the training process was done, each query took about 3 milliseconds to compute. This way, given a query, the deep learning of the present embodiments can design a solution in 3 milliseconds while GA must perform thousands of simulations that each taking hours of computation time.

Table 8 summarizes the advantages of the technique of the present embodiments.

TABLE 8

| | Shallow Neural Network | Deep Neural Network | Genetic Algorithms |
|---|---|---|---|
| Query run time | Fast | Fast | Slow |
| AI technique | Learning | Learning | Optimization |
| Design/Retrieval quality | Poor | Good | Poor |

The GA was benchmarked versus the DNN approach. To work around the lack of efficient model to be queried for each of the thousands of individuals searched during the GA evolution, the trained SPN was used as the model. In the comparison, each of the approaches to retrieve a geometry of the nanostructure was queried based on a set of horizontal and vertical polarizations. At the end of the query, each of the algorithm returned the geometry it has found and the closest spectra for the horizontal and vertical polarizations.

Figure 11A:
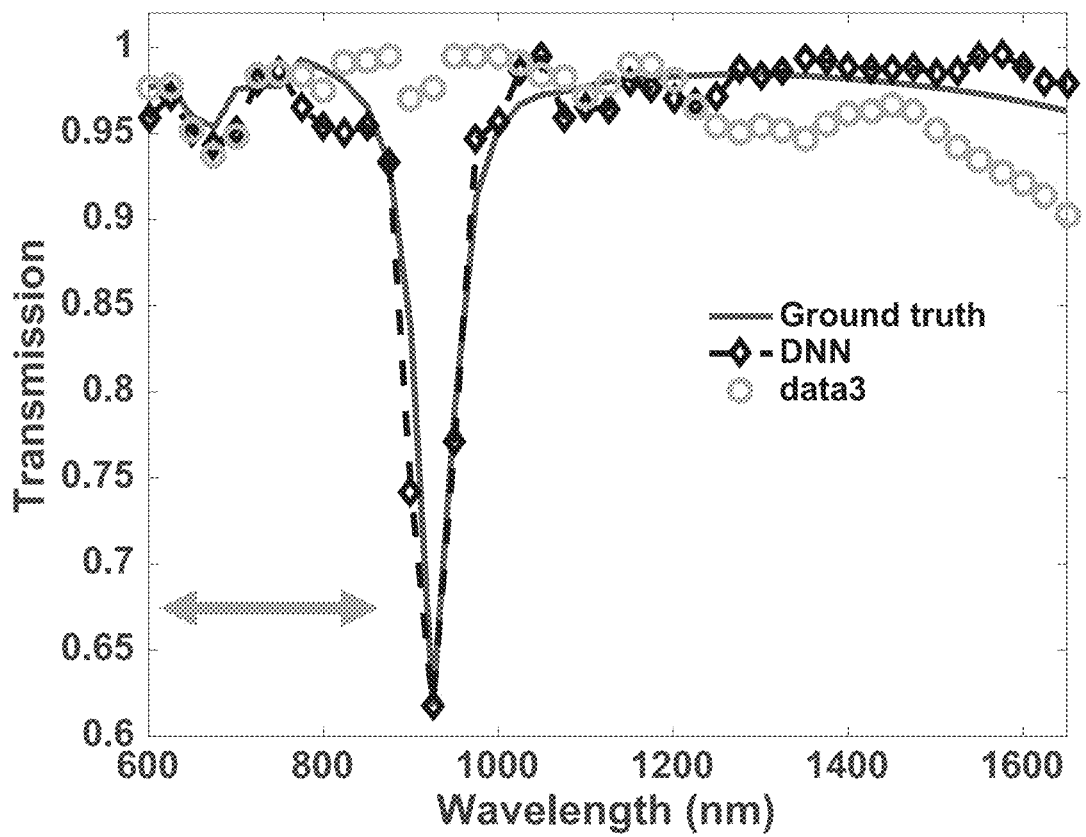
FIGS. 11A-E show a comparison of performance between a Deep Learning technique and a Genetic Algorithm, as obtained in experiments performed according to some embodiments of the present invention.
Figure 11B:
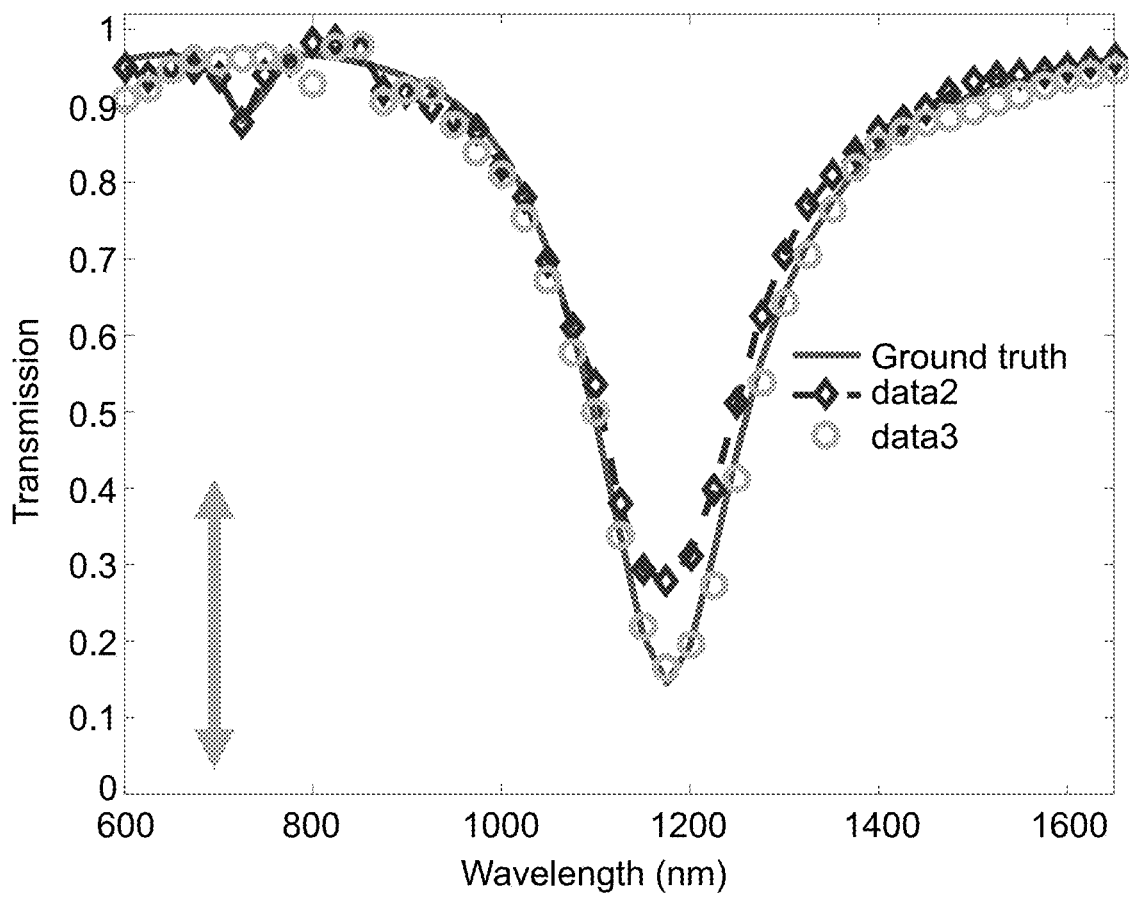
Figures 11C, 11D, 11E:
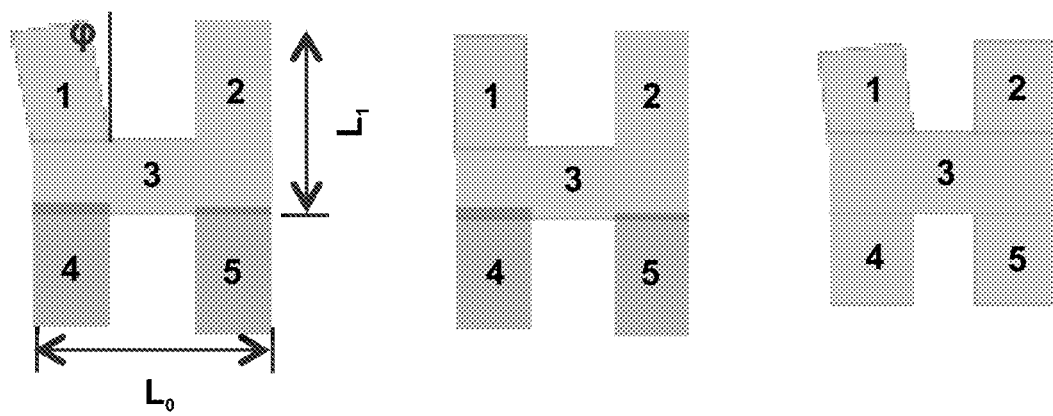

FIGS. 11A-E show the comparison of performance between the network of the present embodiments and GA retrieval, where FIGS. 11A and 11B show the transmission spectra, and FIGS. 11C-E illustrate the ground truth (FIG. 11C), DNN prediction (FIG. 11D) and GA prediction (FIG. 11E) of the shape of the nanostructures. In FIGS. 11C-E, contrasted color represents existing segment ("1") and pale color represents non-existing segment ("0"). Table 9, below lists the ground truth shape, DL predicted shape, and GA predicted shape that correspond to FIGS. 11C-E.

TABLE 9

| Parameter | Ground Truth | DL Prediction | GA Prediction |
|---|---|---|---|
| $L_0$ | 245 nm | 236 nm | 214 nm |
| $L_1$ | 245 nm | 236 nm | 160 nm |
| Leg 1 | 1 | 1 | 1 |
| Leg 2 | 1 | 1 | 1 |
| Leg 3 | 1 | 1 | 1 |
| Leg 4 | 0 | 0 | 1 |
| Leg 5 | 0 | 0 | 1 |
| φ | 10° | 1° | 7° |
| MSE | | 0.09 | 1.18 |

For the horizontal polarization the GA completely failed at the retrieval of the transmission spectrum. Moreover the geometry retrieved is far from the ground truth with an MSE of 1.18. In a striking contrast the network of the present embodiments efficiently retrieved both polarizations spectra and accurately retrieved the geometry with an overall low MSE of 0.09.

The evolutionary approach is fundamentally different since, for every single design task, it searches the parameters space over many generations with each generation encompassing dozens/hundreds of individuals. For this reason, the individuals should be simple enough so their electromagnetic response can be analytically solved, otherwise the optimization task takes a prohibitive amount of time limiting the usefulness of such approach. The technique of the present embodiments is substantially different. The DNN is trained on a set encompassing structures that are not trivial and which response is calculated using numerical approaches. Once the dataset is created and learned, this task is non-recurring and each design task takes only a query of the DNN taking not more than few milliseconds.

To test the boundaries of the DDN retrieval, the performance of the DNN was check with unseen cases such as (i) no nanostructures (meaning the spectra are approximately flat 100% transmission in both axes), and (ii) several cases of more than one geometry (such as two nanobars that are not connected from the same H-form family). In all cases the DNN was presented with the horizontal and vertical input polarization spectra. First, COMSOL simulations were performed on the geometry that was to be examined, and then the optical spectra of the two polarizations were fed as an input to our DNN.

Figure 12A:
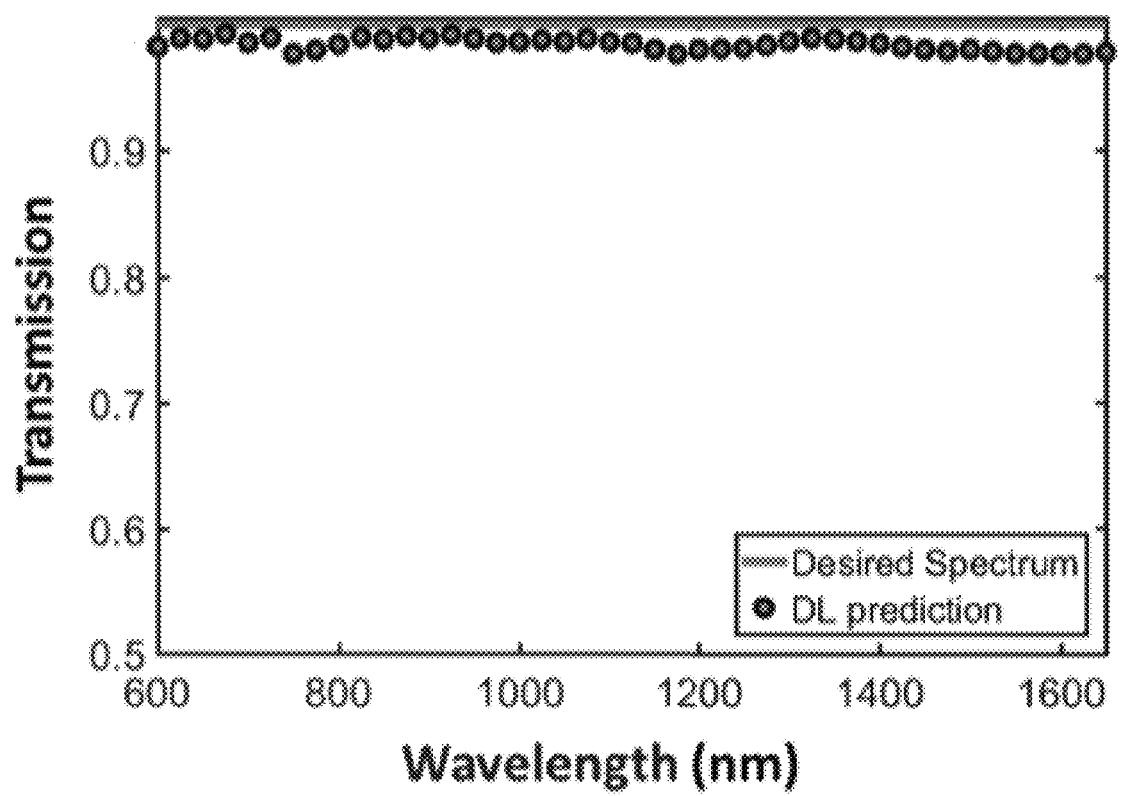
FIGS. 12A-C show results obtained in experiments performed according to some embodiments of the present invention for deep learning retrieval of a "no nanostructure" situation.
Figure 12B:
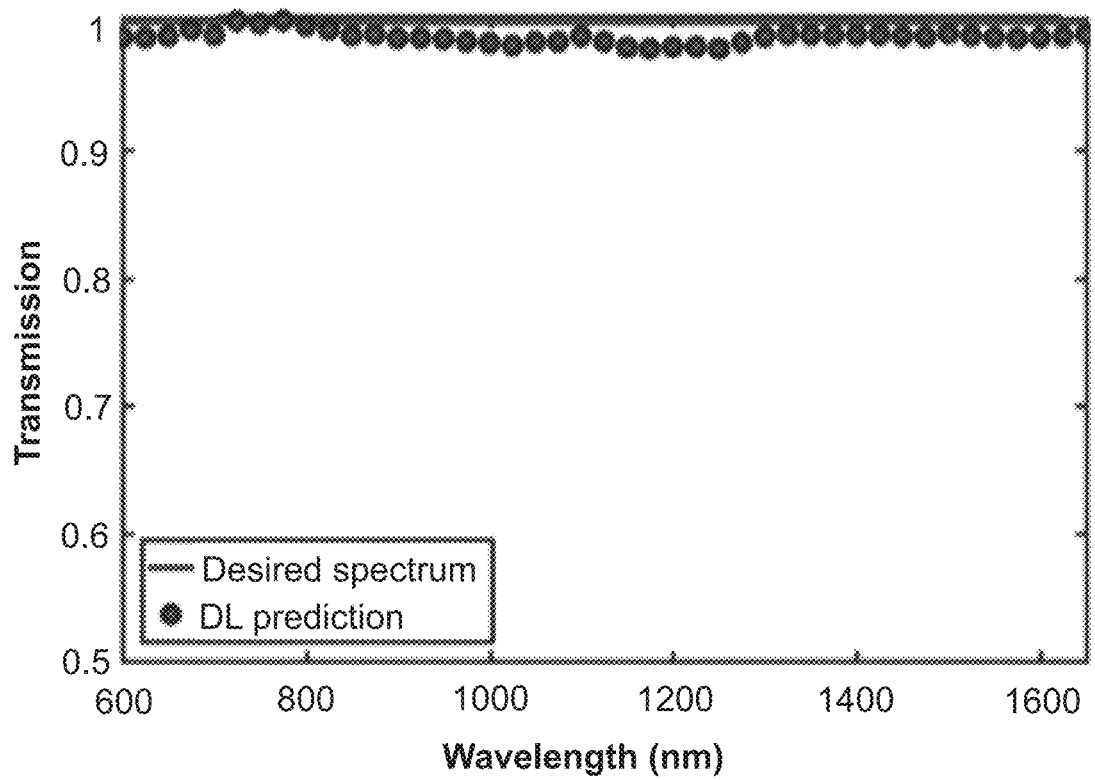
Figure 12C:
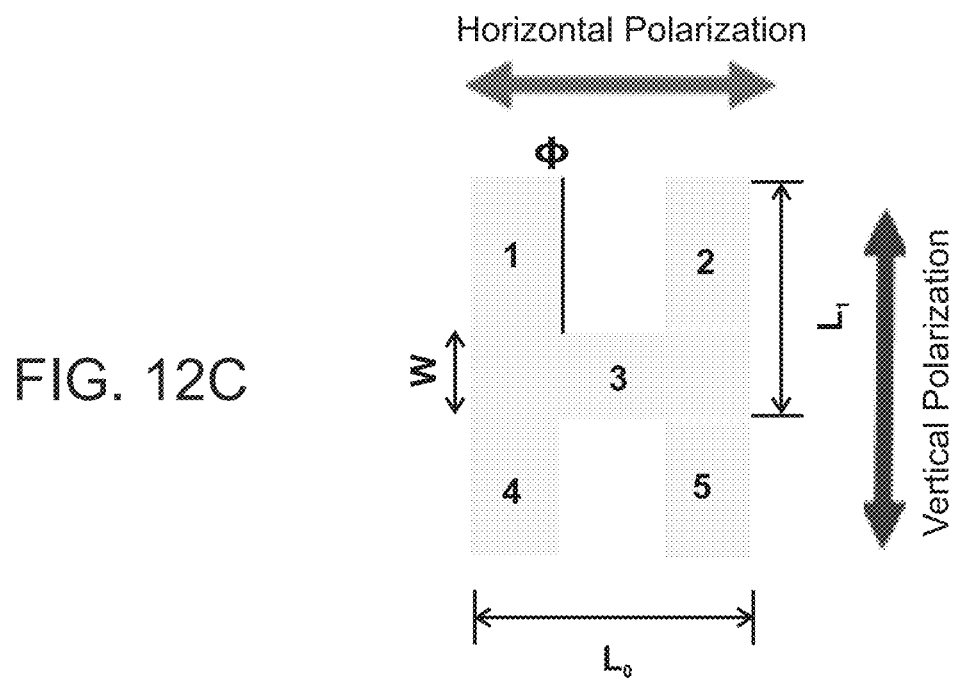

Regarding the empty case ("none"), the DNN was queried with flat spectra in both polarizations mimicking a situation without any nanostructure. FIGS. 12A-C show results obtained for deep learning retrieval of "no nanostructure." FIGS. 12A and 12B show horizontal and vertical polarization spectra, respectively. FIG. 12C shows that network retrieved the output of all the "Leg"s flags as 0 (pale color representing non-existing segment). Table 10, below lists the shape that corresponds to FIG. 12C.

TABLE 10

| Parameter | DL Prediction |
|---|---|
| $L_0$ | 1.3 nm |
| $L_1$ | −2.5 nm |
| Leg 1 | 0 |
| Leg 2 | 0 |
| Leg 3 | 0 |
| Leg 4 | 0 |
| Leg 5 | 0 |
| φ | 0° |

Out of all the infinite possibilities (the returned lengths could have, for example, blown), the network output matched the reality without seeing previously this geometry. This shows that the DNN is not simply "interpolating," but rather has the capability to generalize. It is noted that the angle parameters and the two lengths, the output of the network was at the appropriate scale.

The DNN of the present embodiments was further explored and queried with spectra from structures that are lacking the connecting element (element No. 3 in the H template), thus generating two separate nanostructure's configurations. It is potentially difficult for the DNN to obtain good matching with the desired spectra, with the prediction of wrong nanostructures dimensions. This is expected since all the trained data of the GPN problem contained only configurations with a single nanostructure in one unit cell. While the spectra of two separate structures may seem for the naked eye similar to the spectra of a complex 2D nanostructure (like the case of two nanobars in different orientation vs, the spectra of a "L-shape"), the physics of both configuration is different, mainly because in the single nanostructure, the free electrons are shared and can move freely in both orientation of the complex nanostructure, while in the two separate structures they cannot do so. In this Example two families of predictions are reported: (i) the case of two parallel bars, and (ii) the case of one bar and one L-shape".

Figure 13A:
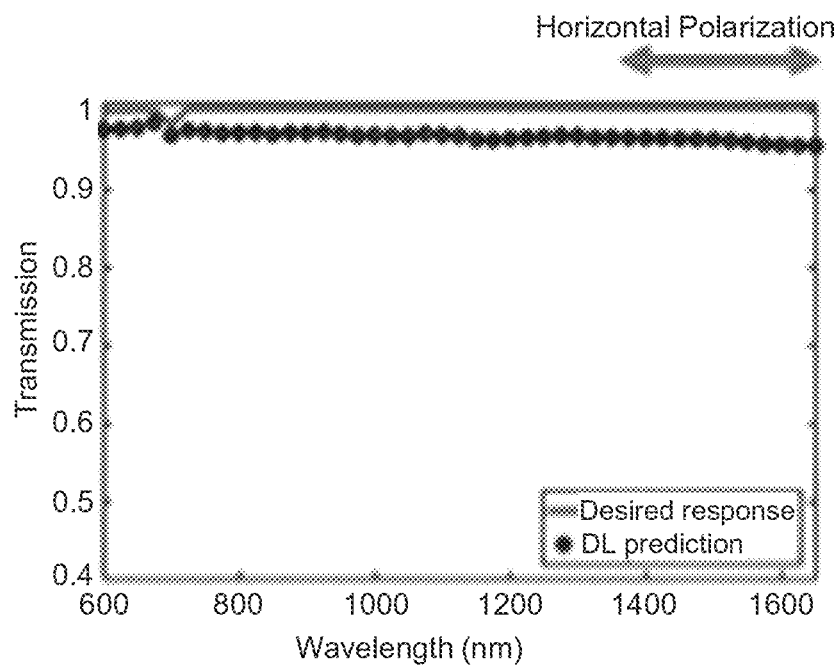
FIGS. 13A-D show results obtained in experiments performed according to some embodiments of the present invention for deep learning retrieval of two parallel and separate bars.
Figure 13B:
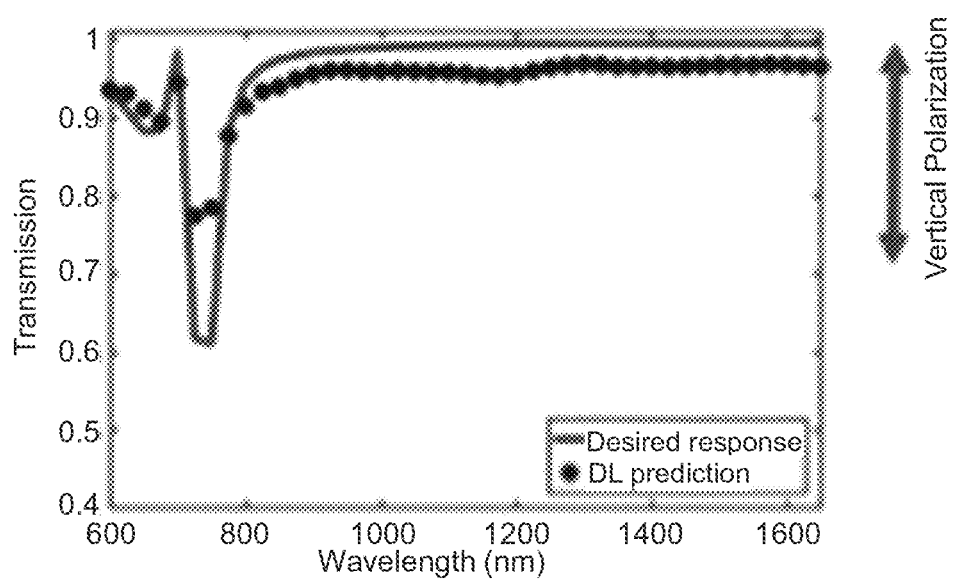
Figure 13C:
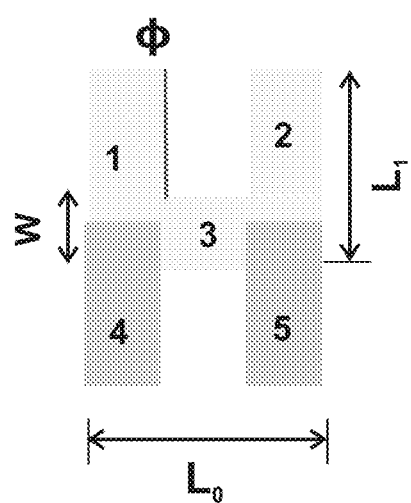
Figure 13D:
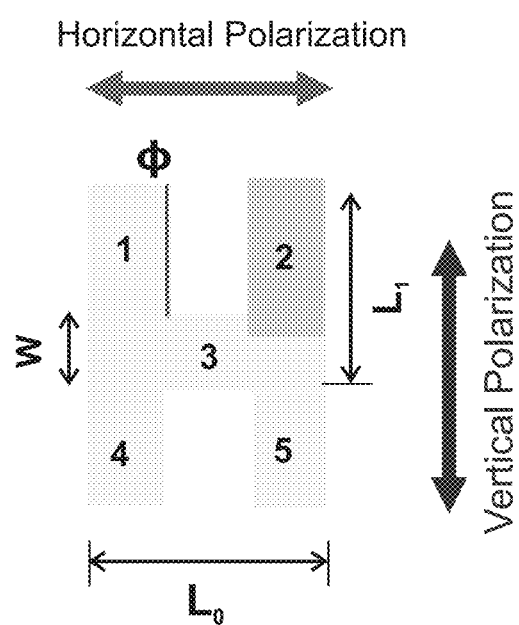

FIGS. 13A-D show results obtained for two parallel separate bars, where FIGS. 13A and 13B show horizontal (13A) and vertical (13B) polarization spectra, FIG. 13C shows the ground truth shape and FIG. 13D shows the predicted shape. In FIGS. 13C and 13D, contrasted color represents existing segment ("1") and pale color represents non-existing segment ("0"). Table 11, below lists the shapes that correspond to FIGS. 13C and 13D.

TABLE 11

| Parameter | Ground truth | DL Prediction |
| --- | --- | --- |
| $L_0$ | 140 nm | −8 nm |
| $L_1$ | 140 nm | 138 nm |
| Leg 1 | 0 | 0 |
| Leg 2 | 0 | 1 |
| Leg 3 | 0 | 0 |
| Leg 4 | 1 | 0 |
| Leg 5 | 1 | 0 |
| φ | 0° | −1° |

The predicted geometry differs from the ground truth but is in fact very similar in that instead of separate legs with a length of 140 nm each, the network predicted existence of one leg (segment No. 2) with 138 nm. Taking into account that each nanostructure is repeating itself periodically in an array configuration, it means that the network have been able to predict the best fitting configuration and obtain an accurate solution but only with a different period length between the nanostructures, which influences on the density of the nanostructures in the array, thus on the dip of the transmission at the resonance. This can be corrected according to some embodiments of the present invention by including the periodicity as a learned parameter.

Figure 14A:
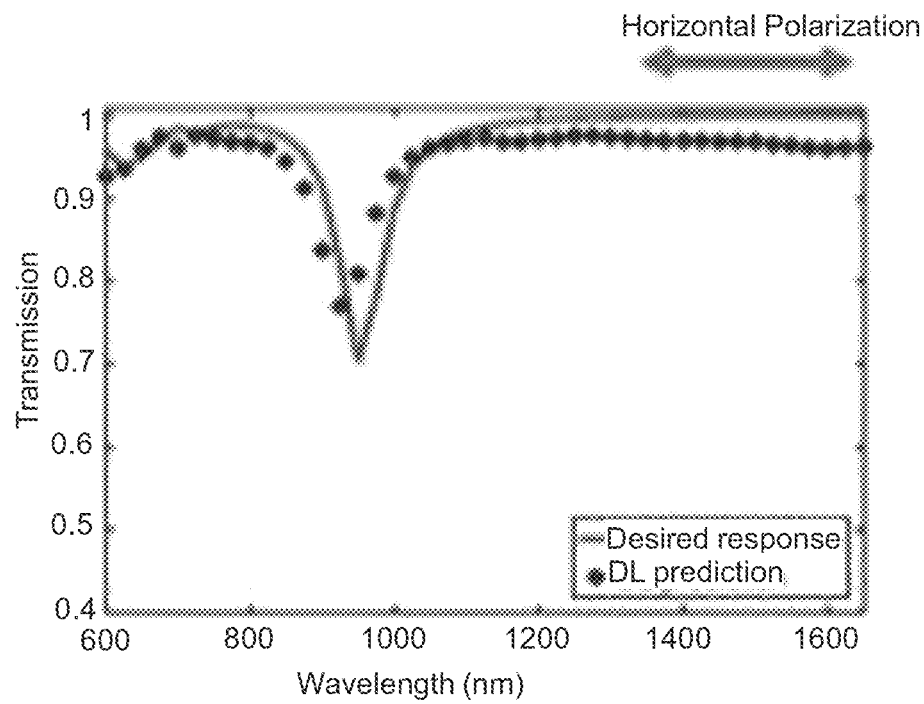
FIGS. 14A-D show results obtained in experiments performed according to some embodiments of the present invention for deep learning retrieval of a flipped L and a bar.
Figure 14B:
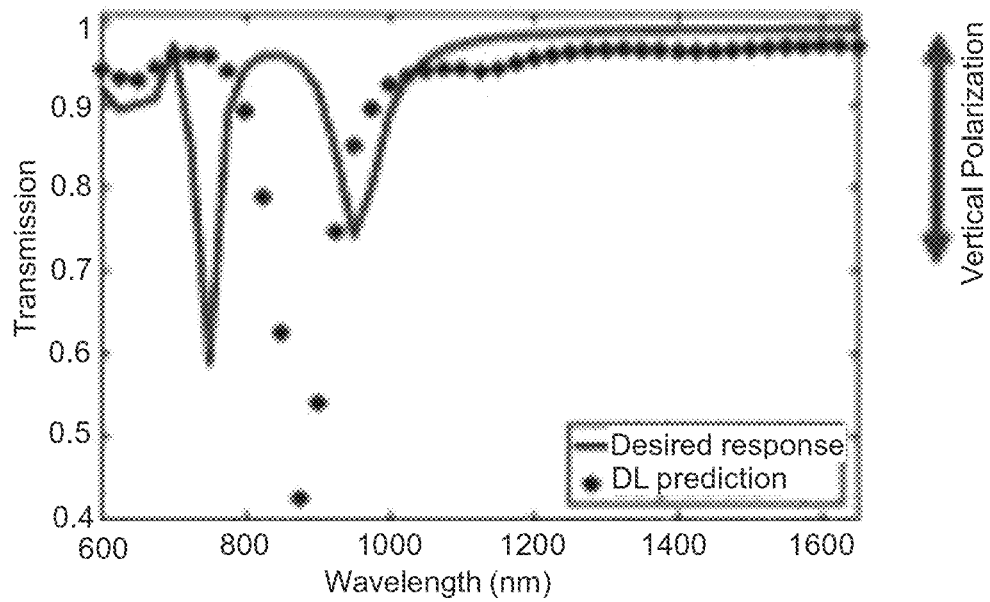
Figure 14C:
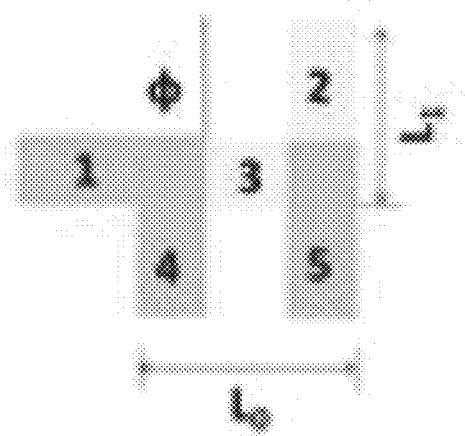
Figure 14D:
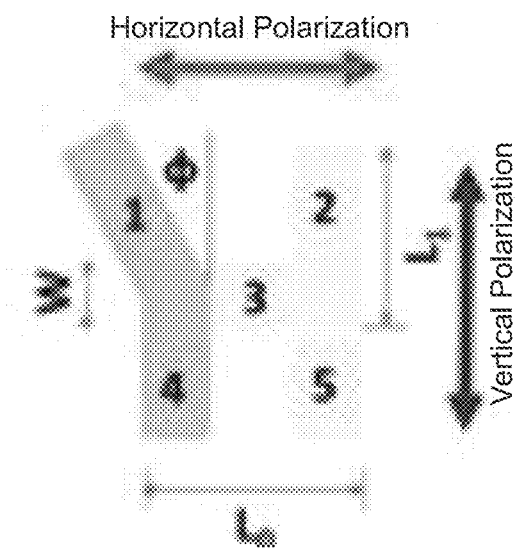

FIGS. 14A-D show results obtained for a flipped L and a bar, where FIGS. 14A and 14B show horizontal (14A) and vertical (14B) polarization spectra, FIG. 14C shows the ground truth shape and FIG. 14D shows the predicted shape. In FIGS. 14C and 14D, contrasted color represents existing segment ("1") and pale color represents non-existing segment ("0"). Table 12, below lists the shapes that correspond to FIGS. 14C and 14D.

TABLE 12

| Parameter | Ground truth | DL Prediction |
| --- | --- | --- |
| $L_0$ | 200 nm | −8 nm |
| $L_1$ | 140 nm | 138 nm |
| Leg 1 | 1 | 1 |
| Leg 2 | 0 | 0 |
| Leg 3 | 0 | 0 |
| Leg 4 | 1 | 1 |
| Leg 5 | 1 | 0 |
| φ | 90° | 35° |

As shown in FIGS. 14A-D and Table 12, the DNN predicted a nanostructure with an accurate spectral response in the horizontal axis. Yet, bearing in mind that the network had been training on a single configuration per unit cell which poses a constraint on finding the best fitting, the predicted geometry and lengths of the nanostructure by the DNN in this case is very appropriate, taking into account the width of the nanostructure, since in the horizontal direction the resonance is proportional to the effective length at that direction.

In the vertical axis, for the two separate nanostructures there are two distinct resonances (each for nanostructure), and the network predicted a geometry that can be thought as a superposition of the two single ones. Therefore, this can be corrected according to some embodiments of the present invention by including the periodicity as a learned parameter.

This Example demonstrates the ability of the network of the present embodiments to accurately characterize a complex nanostructure and predict its shape, but can also be used for predicting other physical and optical parameters such as, but not limited to, temperature, composition of materials, and the like. The network of the present embodiments effectively addresses the inverse problem of designing a geometry for a desired optical response spectrum and also significantly speeds up the direct spectrum prediction of such sub-wavelength structures.

According to the present embodiments, the optimization is carried out only once during the training approach, making the subsequent queries extremely fast, in contrast with the GA schemes. This Example showed that the GA besides being time inefficient, failed at retrieval task, unlike the network of the present embodiments that successfully retrieved the spectra and geometry.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

1. N. Yu, F. Capasso, "Flat optics with designer metasurfaces" Nature Materials 13, 139-150 (2014).
2. A. V. Kildishev, A. Boltasseva, V. M. Shalaev, "Planar photonics with metasurfaces" Science 339, 1232009-1232009 (2013).
3. X. Ni, Z. J. Wong, M. Mrejen, Y. Wang, X. Zhang, "An ultrathin invisibility skin cloak for visible light" Science 349, 1310-1314 (2015).
4. COMSOL Multiphysics v. 5.2. www(dot)comsol(dot)com. COMSOL AB, Stockholm, Sweden.
5. A. F. Oskooi, D. Roundy, M. Ibanescu, P. Bermel, J. D. Joannopoulos, S. G. Johnson, "MEEP: A flexible free-software package for electromagnetic simulations by the FDTD method" Computer Physics Communications 181, 687-702 (2010)
6. Lumerical Solutions, Inc. www(dot)lumerical(dot)com/tcad-products/fdtd/7. D. Colton, R. Kress, "Inverse acoustic and electromagnetic scattering theory." 93, Springer New York (2013).
8. T. W. Odom, E.-A. You, C. M. Sweeney, "Multiscale plasmonic nanostructures and the inverse problem" J. Phys. Chem. Lett. 3, 2611-2616 (2012).
9. Nobel Prize in Chemistry announcement by the Royal Swedish Academy of Sciences for 2014 Available at:

www(dot)nobelprize(dot)org/nobel_prizes/chemistry/laureates/2014/advanced-chemistryprize2014.pdf
10. E. Betzig, et al. "Imaging intracellular fluorescent proteins at nanometer resolution" Science 313, 1642-1645 (2006).
11. M. J. Rust, M. Bates, X. Zhuang, "Sub-diffraction-limit imaging by stochastic optical reconstruction microscopy (STORM)" Nat Meth 3, 793-796 (2006).
12. S. T. Hess, T. P. K. Girirajan, M. D. Mason, "Ultra-high resolution imaging by fluorescence photoactivation localization microscopy" Biophysical Journal 91, 4258-4272 (2006).
13. D. Macias, P.-M. Adam, V. Ruiz-Cortes, R. Rodriguez-Oliveros, J. Sanchez-Gil, "Heuristic optimization for the design of plasmonic nanowires with specific resonant and scattering properties," Opt. Express 20, 13146-13163 (2012).
14. G. M. Sacha, P. Varona, "Artificial intelligence in nanotechnology", Nanotechnology 24 452002 (2013).
15. P. Ginzburg, N. Berkovitch, A. Nevet, I. Shor, M. Orenstein, "Resonances on-demand for plasmonic nanoparticles", Nano Lett. 11, 2329-2333 (2011)
16. A. Krizhevsky, I. Sutskever, G. E. Hinton, "ImageNet classification with deep convolutional neural networks". In NIPS, 1106-1114 (2012).
17. G. Hinton, L. Deng, D. Yu, G. Dahl, A. Mohamed, N. Jaitly, A. Senior, V. Vanhoucke, P. Nguyen, T. Sainath, B. Kingsbury, "Deep neural networks for acoustic modeling in speech recognition" IEEE Signal Processing Magazine, 2982-97 (2012).
18. R. Socher, A. Perelygin, J. Wu, J. Chuang, C. D. Manning, A. Y. Ng, C. Potts, "Recursive deep models for semantic compositionality over a sentiment treebank" In Proceedings of the 2013 Conference on Empirical Methods in Natural Language Processing, pages 1631-1642, Stroudsburg, PA (2013).
19. Y. Taigman, M. Yang, M. Ranzato, L. Wolf, "Deepface: closing the gap to human-level performance in face verification" In Proc. Conference on Computer Vision and Pattern Recognition 1701-1708 (2014).
20. P. Baldi, P. Sadowski, and D. Whiteson, "Searching for exotic particles in high-energy physics with Deep Learning", Nat. Comm. 5, 4308 (2014).
21. P. B. Wigley, P. J. Everittl, A. van den Hengel, J. W. Bastian, M. A. Sooriyabandara, G. D. McDonald, K. S. Hardman, C. D. Quinlivan, P. Manju, C. C. N. Kuhn, I. R. Petersen, A. N. Luiten, J. J. Hope, N. P. Robins & M. R. Hush, ""Fast machine-learning online optimization of ultra-cold-atom experiments", Scientific Reports 6, 25890 (2016).
22. W. J. Brouwer, J. D. Kubicki, J. O. Sofo, C. L. Giles, "An investigation of machine learning methods applied to structure prediction in condensed matter", arXiv: 1405.3564 (2014).
23. K. Hansen, et al. "Assessment and validation of machine learning methods for predicting molecular atomization energies" J. Chem. Theory Comput. 9, 3404-3419 (2013).
24. L. Waller, L. Tian, "Machine learning for 3D microscopy", Nature 523, 416-417 (2015).
25. C. L. Chen, A. Mahjoubfar, L. C. Tai, I. K. Blaby, A. Huang, K. R. Niazi, B. Jalali, "Deep Learning in label-free cell classification", Scientific Reports 6, 21471 (2016).
26. W. Cai, V. Shalaev, "Optical metamaterials" Springer New York. doi:10.1007/978-1-4419-1151-3 (2010).
27. P. Latimer, "Light scattering by ellipsoids" J. of Colloid and Interface Science 53, 102-109 (1975).
28. R. R. Oliveros, R. P. Dominguez, J. A. S Gil, D. Macias, "Plasmon spectroscopy Theoretical and numerical calculations, and optimization techniques", Nanospectroscopy 1:67-96 (2015).
29. RelU-X. Glorot, A. Bordes, Y. Bengio, "Deep sparse rectifier neural networks", Proc. Conf. Artificial Intelligence and Statistics (2011).
30. J. Yosinski, J. Clune, Y. Bengio, H. Lipson, Z. Ghahramani, M. Welling, C. Cortes, N. Lawrence, K. Weinberger, "How transferable are features in deep neural networks?" in Advances in Neural Information Processing Systems 2, pp. 3320-3328, Curran Associates, Inc. (2014).
31. G. Huang, et al. "A series of asymmetrical Phthalocyanines: synthesis and near Infrared properties", Molecules, 18, 4628-4639 (2013).
32. [S1] M. G Silveirinha, C. A. Fernandes, "Effective permittivity of a medium with stratified dielectric host and metallic inclusions", IEEE AP-S International Symp. 4, 3777-3780 (2004).
33. B. Lahiri, R. Dylewicz, R. M. De La Rue, N. P. Johnson, "Impact of titanium adhesion layers on the response of arrays of metallic split-ring resonators (SRRs)," Opt. Express 18, 11202-11208 (2010).
34. J. Niu, Y. Jun Shin, J. Son, Youngbin Lee, J-H. Ahn, H. Yang, "Shifting of surface plasmon resonance due to electromagnetic coupling between graphene and Au nanostructures," Opt. Express 20, 19690-19696 (2012).

What is claimed is:

1. A method of designing a nanostructure, comprising:
receiving a synthetic far field optical response and material properties;
feeding said synthetic far field optical response and material properties to an artificial neural network having at least three hidden layers and being trained specifically to provide output describing shapes of nanostructures; and
extracting from said output of said artificial neural network a shape of a nanostructure corresponding to said far field optical response;
wherein said artificial neural network comprises a geometry predicting subnetwork trained to predict a geometry based on spectra and a spectrum predicting subnetwork trained to predict spectra based on geometry.

2. The method according to claim 1, wherein said artificial neural network comprises at least two parallel sets of layers, wherein said far field optical response and material properties are fed to different sets of layers of said artificial neural network.

3. The method according to claim 1, wherein said far field optical response comprises a spectrum describing a response to a linearly polarized light.

4. The method according to claim 1, wherein said far field optical response comprises a first spectrum describing a response to a horizontally polarized light, and a second spectrum describing a response to a vertically polarized light.

5. The method according to claim 4, wherein said artificial neural network comprises three parallel sets of layers, wherein said first spectrum is fed to a first set of layers, said second spectrum is fed to a second set of layers, and said material properties are fed to third set of layers.

6. The method according to claim 2, wherein all parallel sets of layers have the same number of layers.

7. The method according to claim 6, wherein each set of said parallel sets of layers comprises at most five layers.

8. The method according to claim 6, wherein each set of said parallel sets of layers comprises three layers.

9. The method according to claim 1, wherein said artificial neural network comprises a set of fully connected layers.

10. The method according to claim 9, wherein said set of fully connected layers has at least five but no more than eight layers.

11. The method according to claim 9, wherein said set of fully connected layers has six layers.

12. The method of claim 1, wherein said artificial neural network comprises a bi-directional network.

13. The method according to claim 1, wherein said spectrum predicting subnetwork comprises a set of fully connected layers.

14. The method according to claim 13, wherein said spectrum predicting subnetwork comprises six fully connected layers.

15. The method according to claim 12, wherein each subnetwork comprises the same number of fully connected layers.

16. The method according to claim 12, wherein said geometry predicting subnetwork comprises three parallel sets of layers, and six fully connected layers, wherein each set of said parallel sets of layers comprises three layers.

17. A computer software product, comprising a non-transitory computer-readable medium in which program instructions are stored, which instructions, when read by a data processor, cause the data processor to receive a synthetic far field optical response and material properties, and to execute the method according to claim 1.

18. A system for designing a nanostructure, comprising a data processor configured to receive a synthetic far field optical response and material properties, and to execute the method according to claim 1.

19. A method of manufacturing a nanostructure, the method comprising:
executing the method according to claim 1; and
fabricating a nanostructure having said shape from a material having said and material properties.

20. The method of claim 19, wherein said nanostructure serves as a component in a system selected from the group consisting of a sensor, an imager, a medical system injectable into the body of a mammal, a memory medium, a solar cell, a beam shaping system, and an antenna.

* * * * *